(12) United States Patent
Hu et al.

(10) Patent No.: US 9,798,567 B2
(45) Date of Patent: Oct. 24, 2017

(54) MULTI-HYPERVISOR VIRTUAL MACHINES

(71) Applicant: The Research Foundation for The State University of New York, Binghamton, NY (US)

(72) Inventors: Yaohui Hu, Binghamton, NY (US); Kartik Gopalan, Vestal, NY (US)

(73) Assignee: The Research Foundation for The State University of New York, Binghamton, NY (US)

(*) Notice: Subject to any disclaimer, the term of this patent is extended or adjusted under 35 U.S.C. 154(b) by 0 days.

(21) Appl. No.: 14/947,595

(22) Filed: Nov. 20, 2015

(65) Prior Publication Data
US 2016/0147556 A1 May 26, 2016

Related U.S. Application Data

(60) Provisional application No. 62/084,489, filed on Nov. 25, 2014.

(51) Int. Cl.
*G06F 9/455* (2006.01)

(52) U.S. Cl.
CPC .. *G06F 9/45558* (2013.01); *G06F 2009/4557* (2013.01); *G06F 2009/45579* (2013.01)

(58) Field of Classification Search
CPC .................................................. G06F 9/45558
See application file for complete search history.

(56) References Cited

U.S. PATENT DOCUMENTS

| | | |
|---|---|---|
| 4,694,396 A | 9/1987 | Weisshaar et al. |
| 4,754,395 A | 6/1988 | Weisshaar et al. |
| 4,835,685 A | 5/1989 | Kun |
| 4,914,583 A | 4/1990 | Weisshaar et al. |
| 5,014,192 A | 5/1991 | Mansfield et al. |
| 5,047,925 A | 9/1991 | Kun et al. |
| 5,060,150 A | 10/1991 | Simor |
| 5,062,060 A | 10/1991 | Kolnick |
| 5,109,486 A | 4/1992 | Seymour |
| 5,165,018 A | 11/1992 | Simor |
| 5,226,172 A | 7/1993 | Seymour et al. |
| 5,335,323 A | 8/1994 | Kolnick |

(Continued)

OTHER PUBLICATIONS

Bosch, Virtualization, 2010, Lehigh University.*

*Primary Examiner* — Charlie Sun
(74) *Attorney, Agent, or Firm* — Steven M. Hoffberg, Esq.; Ostrolenk Faber LLP

(57) ABSTRACT

Standard nested virtualization allows a hypervisor to run other hypervisors as guests, i.e. a level-0 (L0) hypervisor can run multiple level-1 (L1) hypervisors, each of which can run multiple level-2 (L2) virtual machines (VMs), with each L2 VM is restricted to run on only one L1 hypervisor. Span provides a Multi-hypervisor VM in which a single VM can simultaneously run on multiple hypervisors, which permits a VM to benefit from different services provided by multiple hypervisors that co-exist on a single physical machine. Span allows (a) the memory footprint of the VM to be shared across two hypervisors, and (b) the responsibility for CPU and I/O scheduling to be distributed among the two hypervisors. Span VMs can achieve performance comparable to traditional (single-hypervisor) nested VMs for common benchmarks.

20 Claims, 6 Drawing Sheets

(56) References Cited

U.S. PATENT DOCUMENTS

| | | |
|---|---|---|
| 5,502,839 A | 3/1996 | Kolnick |
| 6,324,685 B1 | 11/2001 | Balassanian |
| 6,496,871 B1 | 12/2002 | Jagannathan et al. |
| 6,854,108 B1 | 2/2005 | Choi |
| 6,976,248 B2 | 12/2005 | Balassanian |
| 6,976,255 B1 | 12/2005 | Clark et al. |
| 7,155,606 B1 | 12/2006 | Smith et al. |
| 7,165,104 B2 | 1/2007 | Wang |
| 7,212,961 B2 | 5/2007 | Settles |
| 7,379,990 B2 | 5/2008 | Tsao |
| 7,415,703 B2 | 8/2008 | Aguilar, Jr. et al. |
| 7,444,632 B2 | 10/2008 | Minor et al. |
| 7,467,381 B2 | 12/2008 | Madukkarumukumana et al. |
| 7,478,390 B2 | 1/2009 | Brokenshire et al. |
| 7,496,917 B2 | 2/2009 | Brokenshire et al. |
| 7,516,456 B2 | 4/2009 | Aguilar, Jr. et al. |
| 7,523,157 B2 | 4/2009 | Aguilar, Jr. et al. |
| 7,549,145 B2 | 6/2009 | Aguilar, Jr. et al. |
| 7,650,599 B2 | 1/2010 | Smith et al. |
| 7,653,794 B2 | 1/2010 | Michael et al. |
| 7,653,908 B2 | 1/2010 | Aguilar, Jr. et al. |
| 7,685,566 B2 | 3/2010 | Brown, Jr. et al. |
| 7,694,306 B2 | 4/2010 | Minor et al. |
| 7,748,006 B2 | 6/2010 | Aguilar, Jr. et al. |
| 7,802,249 B2 | 9/2010 | Liang et al. |
| 7,818,202 B1 | 10/2010 | Gadbut et al. |
| 7,861,244 B2 | 12/2010 | Vasile |
| 7,918,732 B2 | 4/2011 | Van Noland et al. |
| 7,921,151 B2 | 4/2011 | Aguilar, Jr. et al. |
| 7,934,222 B2 | 4/2011 | Anderson et al. |
| 7,984,203 B2 | 7/2011 | Madukkarumukumana et al. |
| 7,996,510 B2 | 8/2011 | Vicente |
| 8,082,228 B2 | 12/2011 | Mu |
| 8,091,097 B2 | 1/2012 | Chen et al. |
| 8,108,855 B2 | 1/2012 | Dias et al. |
| 8,139,590 B2 | 3/2012 | Manral |
| 8,146,098 B2 | 3/2012 | Fitzgerald et al. |
| 8,150,801 B2 | 4/2012 | Srivastava et al. |
| 8,175,099 B2 | 5/2012 | Hodges et al. |
| 8,190,881 B2 | 5/2012 | Wang et al. |
| 8,219,981 B2 | 7/2012 | Aguilar, Jr. et al. |
| 8,233,621 B2 | 7/2012 | Li |
| 8,234,640 B1 | 7/2012 | Fitzgerald et al. |
| 8,234,641 B2 | 7/2012 | Fitzgerald et al. |
| 8,301,863 B2 | 10/2012 | Hall et al. |
| 8,311,225 B2 | 11/2012 | Singh et al. |
| 8,312,453 B2 | 11/2012 | Shah |
| 8,327,350 B2 | 12/2012 | Chess et al. |
| 8,327,357 B2 | 12/2012 | Amsden |
| 8,346,933 B2 | 1/2013 | Kawato |
| 8,359,488 B2 | 1/2013 | Costa |
| 8,407,688 B2 | 3/2013 | Fitzgerald et al. |
| 8,418,173 B2 | 4/2013 | Fitzgerald et al. |
| 8,429,269 B2 | 4/2013 | Kutner |
| 8,458,695 B2 | 6/2013 | Fitzgerald et al. |
| 8,463,730 B1 | 6/2013 | Smith et al. |
| 8,478,917 B2 | 7/2013 | Scott et al. |
| 8,499,112 B2 | 7/2013 | Mine et al. |
| 8,499,191 B2 | 7/2013 | Shimada et al. |
| 8,514,854 B2 | 8/2013 | Wang et al. |
| 8,532,572 B2 | 9/2013 | Renard et al. |
| 8,539,057 B2 | 9/2013 | Chang et al. |
| 8,549,521 B2 | 10/2013 | Brokenshire et al. |
| 8,555,279 B2 | 10/2013 | Nonaka et al. |
| 8,606,753 B2 | 12/2013 | Mu |
| 8,607,067 B1 | 12/2013 | Janse Van Rensburg et al. |
| 8,612,971 B1 | 12/2013 | Fitzgerald et al. |
| 8,631,408 B2 | 1/2014 | Shah |
| 8,639,783 B1 | 1/2014 | Bakke et al. |
| 8,639,789 B2 | 1/2014 | Cho |
| 8,645,733 B2 | 2/2014 | Kansal et al. |
| 8,667,268 B2 | 3/2014 | Wang et al. |
| 8,677,351 B2 | 3/2014 | Le et al. |
| 8,677,449 B1 | 3/2014 | Beda, III |
| 8,683,560 B1 | 3/2014 | Brooker et al. |
| 8,687,653 B2 | 4/2014 | Bransi et al. |
| 8,688,823 B1 | 4/2014 | Christensen et al. |
| 8,689,292 B2 | 4/2014 | Williams et al. |
| 8,713,281 B1 | 4/2014 | Knight |
| 8,713,545 B2 | 4/2014 | Fiorini |
| 8,719,369 B1 | 5/2014 | Brown et al. |
| 8,737,262 B2 | 5/2014 | Tsirkin |
| 8,745,091 B2 | 6/2014 | McHenry et al. |
| 8,752,045 B2 | 6/2014 | Fitzgerald et al. |
| 8,763,005 B2 | 6/2014 | Staelin et al. |
| 8,776,050 B2 | 7/2014 | Plouffe et al. |
| 8,792,366 B2 | 7/2014 | Terry et al. |
| 8,799,645 B2 | 8/2014 | Wang et al. |
| 8,806,025 B2 | 8/2014 | Hummel et al. |
| 8,806,186 B2 | 8/2014 | Tsirkin et al. |
| 8,819,677 B2 | 8/2014 | Day, II et al. |
| 8,832,688 B2 | 9/2014 | Tang et al. |
| 8,832,691 B2 | 9/2014 | Fitzgerald et al. |
| 8,839,246 B2 | 9/2014 | Fitzgerald et al. |
| 8,850,433 B2 | 9/2014 | Fitzgerald et al. |
| 8,856,779 B2 | 10/2014 | Balassanian |
| 8,863,129 B2 | 10/2014 | Dawson et al. |
| 8,893,125 B2 | 11/2014 | Shah |
| 8,904,113 B2 | 12/2014 | Chen et al. |
| 8,924,917 B2 | 12/2014 | Fitzgerald et al. |
| 8,935,696 B2 | 1/2015 | Liao et al. |
| 8,942,672 B2 | 1/2015 | Renard et al. |
| 8,948,184 B2 | 2/2015 | Hodges et al. |
| 8,949,825 B1 | 2/2015 | Fitzgerald et al. |
| 8,949,826 B2 | 2/2015 | Fitzgerald et al. |
| 8,954,562 B2 | 2/2015 | Vicente |
| 8,958,293 B1 | 2/2015 | Anderson |
| 8,958,746 B2 | 2/2015 | Renard et al. |
| 9,003,363 B2 | 4/2015 | Lupu et al. |
| 9,015,703 B2 | 4/2015 | Fitzgerald et al. |
| 9,038,062 B2 | 5/2015 | Fitzgerald et al. |
| 9,047,021 B2 | 6/2015 | Warszawski et al. |
| 9,049,193 B2 | 6/2015 | Mai et al. |
| 9,063,772 B2 | 6/2015 | Dawson et al. |
| 9,081,732 B2 | 7/2015 | Srivastava et al. |
| 9,086,917 B1 | 7/2015 | Fitzgerald et al. |
| 9,088,605 B2 | 7/2015 | Carpenter et al. |
| 9,094,334 B2 | 7/2015 | Wang et al. |
| 9,116,874 B2 | 8/2015 | Ueda |
| 9,128,704 B2 | 9/2015 | Kato et al. |
| 9,128,873 B2 | 9/2015 | Foster, Sr. et al. |
| 9,130,901 B2 | 9/2015 | Lee |
| 9,134,988 B2 | 9/2015 | Cavazza et al. |
| 9,141,565 B2 | 9/2015 | Foster, Sr. et al. |
| 9,141,786 B2 | 9/2015 | Edery et al. |
| 9,152,334 B2 | 10/2015 | Mu |
| 9,160,659 B2 | 10/2015 | Tsirkin |
| 9,170,833 B2 | 10/2015 | Fitzgerald et al. |
| 9,178,908 B2 | 11/2015 | Call et al. |
| 9,184,981 B2 | 11/2015 | Sarikaya |
| 9,189,621 B2 | 11/2015 | Touboul |
| 9,195,496 B2 | 11/2015 | Dawson et al. |
| 9,203,750 B2 | 12/2015 | Tsirkin |
| 9,207,872 B2 | 12/2015 | Mu |
| 9,213,513 B2 | 12/2015 | Hartz et al. |
| 9,218,176 B1 | 12/2015 | Alberti et al. |
| 9,218,193 B2 | 12/2015 | Brant et al. |
| 9,218,194 B2 | 12/2015 | Brant et al. |
| 9,219,755 B2 | 12/2015 | Touboul |
| 9,225,737 B2 | 12/2015 | Call et al. |
| 9,225,772 B2 | 12/2015 | Lui et al. |
| 9,229,645 B2 | 1/2016 | Nakajima |
| 9,229,750 B1 | 1/2016 | Mehat et al. |
| 9,231,864 B2 | 1/2016 | Dong |
| 2004/0044875 A1 | 3/2004 | Settles |
| 2004/0215749 A1 | 10/2004 | Tsao |
| 2005/0044301 A1 | 2/2005 | Vasilevsky et al. |
| 2005/0080982 A1 | 4/2005 | Vasilevsky et al. |
| 2005/0120160 A1 | 6/2005 | Plouffe et al. |
| 2005/0166183 A1 | 7/2005 | Brown, Jr. et al. |
| 2006/0030985 A1 | 2/2006 | Lawida et al. |
| 2006/0230219 A1 | 10/2006 | Njoku et al. |
| 2006/0252543 A1 | 11/2006 | Van Noland et al. |
| 2006/0282247 A1 | 12/2006 | Brennan et al. |

(56) References Cited

U.S. PATENT DOCUMENTS

| | | |
|---|---|---|
| 2007/0099683 A1 | 5/2007 | Panther Trice et al. |
| 2007/0140266 A1 | 6/2007 | Njoku et al. |
| 2007/0283350 A1 | 12/2007 | Anderson et al. |
| 2007/0300220 A1 | 12/2007 | Seliger et al. |
| 2007/0300221 A1 | 12/2007 | Hartz et al. |
| 2008/0091761 A1 | 4/2008 | Tsao |
| 2008/0163171 A1 | 7/2008 | Chess et al. |
| 2008/0163194 A1 | 7/2008 | Dias et al. |
| 2008/0235769 A1 | 9/2008 | Purcell et al. |
| 2008/0244577 A1 | 10/2008 | Le et al. |
| 2008/0309665 A1 | 12/2008 | Gregory et al. |
| 2009/0077632 A1 | 3/2009 | Carpenter et al. |
| 2009/0089300 A1 | 4/2009 | Vicente |
| 2009/0089410 A1 | 4/2009 | Vicente |
| 2009/0094316 A1 | 4/2009 | Chen et al. |
| 2009/0100500 A1 | 4/2009 | Wang et al. |
| 2009/0144222 A1 | 6/2009 | Modzelewski |
| 2009/0144241 A1 | 6/2009 | Modzelewski |
| 2009/0144242 A1 | 6/2009 | Modzelewski |
| 2009/0144243 A1 | 6/2009 | Modzelewski |
| 2009/0144265 A1 | 6/2009 | Modzelewski |
| 2009/0144317 A1 | 6/2009 | Modzelewski |
| 2009/0144318 A1 | 6/2009 | Modzelewski |
| 2009/0210352 A1 | 8/2009 | Chang et al. |
| 2009/0210358 A1 | 8/2009 | Chang et al. |
| 2009/0210503 A1 | 8/2009 | Chang et al. |
| 2009/0249222 A1 | 10/2009 | Schmidt et al. |
| 2009/0259345 A1 | 10/2009 | Kato et al. |
| 2009/0328170 A1 | 12/2009 | Williams et al. |
| 2010/0002875 A1 | 1/2010 | Li |
| 2010/0005465 A1 | 1/2010 | Kawato |
| 2010/0017530 A1 | 1/2010 | Gaur |
| 2010/0088699 A1 | 4/2010 | Sasaki |
| 2010/0114833 A1 | 5/2010 | Mu |
| 2010/0125708 A1 | 5/2010 | Hall et al. |
| 2010/0162236 A1 | 6/2010 | Witchey et al. |
| 2010/0169505 A1 | 7/2010 | Noguchi et al. |
| 2010/0169514 A1 | 7/2010 | Noguchi et al. |
| 2010/0198742 A1 | 8/2010 | Chang et al. |
| 2010/0274947 A1 | 10/2010 | Ohta et al. |
| 2010/0332428 A1 | 12/2010 | McHenry et al. |
| 2011/0010185 A1 | 1/2011 | Gadbut et al. |
| 2011/0010695 A1 | 1/2011 | Fiorini |
| 2011/0038482 A1 | 2/2011 | Singh et al. |
| 2011/0047544 A1 | 2/2011 | Yehuda et al. |
| 2011/0066753 A1 | 3/2011 | Wang et al. |
| 2011/0072428 A1 | 3/2011 | Day et al. |
| 2011/0103399 A1 | 5/2011 | Bransi et al. |
| 2011/0107008 A1 | 5/2011 | Ben-Yehuda et al. |
| 2011/0119473 A1 | 5/2011 | Hyvonen et al. |
| 2011/0138072 A1 | 6/2011 | Kutner |
| 2011/0142060 A1 | 6/2011 | Manral |
| 2011/0143663 A1 | 6/2011 | Renard et al. |
| 2011/0153909 A1 | 6/2011 | Dong |
| 2011/0161716 A1 | 6/2011 | Hyvonen et al. |
| 2011/0296411 A1 | 12/2011 | Tang et al. |
| 2012/0030671 A1 | 2/2012 | Matsubara et al. |
| 2012/0066681 A1 | 3/2012 | Levy et al. |
| 2012/0072396 A1 | 3/2012 | Mu |
| 2012/0106365 A1 | 5/2012 | Terry et al. |
| 2012/0117565 A1 | 5/2012 | Staelin et al. |
| 2012/0131571 A1 | 5/2012 | Ben-Yehuda et al. |
| 2012/0131574 A1 | 5/2012 | Day et al. |
| 2012/0140639 A1 | 6/2012 | Kao et al. |
| 2012/0159232 A1 | 6/2012 | Shimada et al. |
| 2012/0180039 A1 | 7/2012 | Bravery et al. |
| 2012/0191948 A1 | 7/2012 | Day et al. |
| 2012/0198440 A1 | 8/2012 | Shah |
| 2012/0216187 A1* | 8/2012 | Ben-Yehuda ....... G06F 9/45558 718/1 |
| 2012/0216254 A1 | 8/2012 | Wang et al. |
| 2012/0221849 A1 | 8/2012 | Wang et al. |
| 2012/0229428 A1 | 9/2012 | Tavakoli et al. |
| 2012/0233282 A1 | 9/2012 | Voccio et al. |
| 2012/0233331 A1 | 9/2012 | Voccio et al. |
| 2012/0233611 A1 | 9/2012 | Voccio |
| 2012/0260247 A1 | 10/2012 | Huang et al. |
| 2012/0265920 A1 | 10/2012 | Baron |
| 2012/0272241 A1 | 10/2012 | Nonaka et al. |
| 2012/0290865 A1 | 11/2012 | Kansal et al. |
| 2012/0331134 A1 | 12/2012 | Lynn et al. |
| 2013/0036417 A1 | 2/2013 | Chen et al. |
| 2013/0054950 A1 | 2/2013 | Tsirkin et al. |
| 2013/0080641 A1 | 3/2013 | Lui et al. |
| 2013/0117744 A1 | 5/2013 | Klein et al. |
| 2013/0132951 A1 | 5/2013 | Shah |
| 2013/0132952 A1 | 5/2013 | Shah |
| 2013/0139153 A1 | 5/2013 | Shah |
| 2013/0139159 A1 | 5/2013 | Eidus et al. |
| 2013/0145362 A1 | 6/2013 | Dawson et al. |
| 2013/0205044 A1 | 8/2013 | Wang et al. |
| 2013/0232483 A1 | 9/2013 | Chen et al. |
| 2013/0232486 A1 | 9/2013 | Chen et al. |
| 2013/0238802 A1 | 9/2013 | Sarikaya |
| 2013/0247038 A1 | 9/2013 | Luo et al. |
| 2013/0263113 A1 | 10/2013 | Cavazza et al. |
| 2013/0263118 A1 | 10/2013 | Kannan et al. |
| 2013/0268799 A1 | 10/2013 | Mestery et al. |
| 2013/0295847 A1 | 11/2013 | Renard et al. |
| 2013/0297800 A1 | 11/2013 | Considine et al. |
| 2013/0304704 A1 | 11/2013 | Mu |
| 2013/0326335 A1 | 12/2013 | Chang et al. |
| 2013/0326505 A1 | 12/2013 | Shah |
| 2013/0332363 A1 | 12/2013 | Renard et al. |
| 2013/0346531 A1 | 12/2013 | Hummel et al. |
| 2013/0346971 A1 | 12/2013 | Liao et al. |
| 2014/0019963 A1 | 1/2014 | Deng et al. |
| 2014/0019968 A1 | 1/2014 | Deng et al. |
| 2014/0025670 A1 | 1/2014 | Daran et al. |
| 2014/0032382 A1 | 1/2014 | Hamann et al. |
| 2014/0068703 A1 | 3/2014 | Balus et al. |
| 2014/0088991 A1 | 3/2014 | Bakes et al. |
| 2014/0101398 A1 | 4/2014 | Mu |
| 2014/0114792 A1 | 4/2014 | Smith et al. |
| 2014/0115137 A1 | 4/2014 | Keisam |
| 2014/0115586 A1* | 4/2014 | Hong ................. G06F 9/5077 718/1 |
| 2014/0122659 A1 | 5/2014 | Kaul et al. |
| 2014/0136985 A1 | 5/2014 | Albir et al. |
| 2014/0149768 A1 | 5/2014 | Kansal et al. |
| 2014/0156960 A1 | 6/2014 | Simoncelli |
| 2014/0196130 A1 | 7/2014 | Brooker et al. |
| 2014/0201740 A1 | 7/2014 | Le et al. |
| 2014/0208045 A1 | 7/2014 | Warszawski et al. |
| 2014/0229943 A1* | 8/2014 | Tian .................. G06F 9/45533 718/1 |
| 2014/0233568 A1 | 8/2014 | Dong |
| 2014/0241355 A1 | 8/2014 | Tsirkin |
| 2014/0245069 A1 | 8/2014 | Hu et al. |
| 2014/0245294 A1 | 8/2014 | Kaul |
| 2014/0245423 A1 | 8/2014 | Lee |
| 2014/0258483 A1 | 9/2014 | Mai et al. |
| 2014/0278453 A1 | 9/2014 | Primack et al. |
| 2014/0279784 A1 | 9/2014 | Casalaina et al. |
| 2014/0279937 A1 | 9/2014 | McHenry et al. |
| 2014/0282539 A1 | 9/2014 | Sonnek |
| 2014/0317681 A1 | 10/2014 | Shende |
| 2014/0351545 A1 | 11/2014 | Nakajima |
| 2014/0359047 A1 | 12/2014 | Lee et al. |
| 2014/0359267 A1 | 12/2014 | Moriki et al. |
| 2014/0359283 A1 | 12/2014 | Lee et al. |
| 2014/0359613 A1 | 12/2014 | Tsirkin |
| 2014/0379775 A1 | 12/2014 | Korangy et al. |
| 2014/0380009 A1 | 12/2014 | Lemay et al. |
| 2015/0020065 A1 | 1/2015 | Brant et al. |
| 2015/0020067 A1 | 1/2015 | Brant et al. |
| 2015/0026684 A1 | 1/2015 | Dawson et al. |
| 2015/0029853 A1 | 1/2015 | Raindel et al. |
| 2015/0032756 A1 | 1/2015 | Sigler |
| 2015/0033002 A1* | 1/2015 | Cordero ................ G06F 12/023 713/1 |
| 2015/0052253 A1 | 2/2015 | Johnson et al. |
| 2015/0052258 A1 | 2/2015 | Johnson et al. |
| 2015/0058841 A1 | 2/2015 | Krempa et al. |

(56) References Cited

U.S. PATENT DOCUMENTS

| | | |
|---|---|---|
| 2015/0088982 A1 | 3/2015 | Johnson et al. |
| 2015/0089292 A1 | 3/2015 | Ueda |
| 2015/0106802 A1 | 4/2015 | Ivanov et al. |
| 2015/0106803 A1 | 4/2015 | Srivastava et al. |
| 2015/0106952 A1 | 4/2015 | Bacher et al. |
| 2015/0113552 A1 | 4/2015 | Chang et al. |
| 2015/0120887 A1 | 4/2015 | Hu et al. |
| 2015/0120936 A1 | 4/2015 | Palan et al. |
| 2015/0121366 A1 | 4/2015 | Neiger et al. |
| 2015/0134707 A1 | 5/2015 | Doherty |
| 2015/0172136 A1 | 6/2015 | Tang et al. |
| 2015/0178330 A1 | 6/2015 | March |
| 2015/0188833 A1 | 7/2015 | Fusco et al. |
| 2015/0212956 A1 | 7/2015 | Tsirkin et al. |
| 2015/0213195 A1 | 7/2015 | Blechman |
| 2015/0242228 A1 | 8/2015 | Voccio |
| 2015/0244568 A1 | 8/2015 | Asayag et al. |
| 2015/0248306 A1 | 9/2015 | Dawson et al. |
| 2015/0286490 A1 | 10/2015 | Chen |
| 2015/0341318 A1 | 11/2015 | Lee |
| 2015/0356641 A1 | 12/2015 | Barlow et al. |
| 2015/0356691 A1 | 12/2015 | Barlow et al. |
| 2015/0363180 A1 | 12/2015 | Alberti et al. |
| 2015/0363181 A1 | 12/2015 | Alberti et al. |
| 2015/0370596 A1 | 12/2015 | Fahs et al. |

\* cited by examiner

MULTI-HYPERVISOR VIRTUAL MACHINES

CROSS REFERENCE TO RELATED APPLICATIONS

The present application is a non-provisional of, and claims benefit of priority from, U.S. Provisional Patent Application No. 62/084,489, filed Nov. 25, 2015, the entirety of which is expressly incorporated herein by reference.

STATEMENT OF GOVERNMENT SUPPORT

This work was supported in part by the National Science Foundation through grants CNS-0845832, CNS-1320689, CNS-0855204, and CNS-1040666.

BACKGROUND OF THE INVENTION

In traditional, or single-level, machine virtualization a hypervisor controls the hardware (bare-metal) resources and runs one or more concurrent virtual machines (VMs), each VM running its own guest operating system. Nested virtualization enables a bare-metal hypervisor (level-0 or L0) to run one or more hypervisors (level-1 or L1), each of which can run its own set of VMs [18, 7, 29, 13] (level-2 or L2). Nested virtualization has many known potential benefits [7]. It can be used to host VMs running commodity operating systems, such as Linux and Windows, that utilize hardware virtualization to host other operating systems. Hypervisors that are embedded in firmware [15, 31] could use virtualization to run other hypervisors. Infrastructure-as-a-Service (IaaS) providers could use nested virtualization to allow users to run their own hypervisors and to allow migration of VMs across different IaaS providers [45]. Nested virtualization could also allow new approaches to hypervisor-level security [35, 33, 37, 20, 21, 14, 4], hypervisor development, and testing.

ADVANTAGES OF THE INVENTION

Besides the above benefits, nested virtualization also opens up a new possibility. L1 hypervisors that provide different services could be co-located on the same machine. An L2 VM according to the present technology could simultaneously use these diverse L1 services. For instance, besides running on a commodity L1 hypervisor, an L2 VM could simultaneously run on another L1 hypervisor that provides an intrusion detection service, or a deduplication [46] service, or a real-time CPU or I/O scheduling service.

Unfortunately, current nested virtualization solutions restrict an L2 VM to run on only one L1 hypervisor at a time. This prevents an L2 VM from taking advantage of services from multiple L1 hypervisors.

Nested VMs were originally proposed and refined in [16, 17, 32, 5, 6]. IBM z/VM [29] was the first implementation of nested VMs using multiple levels of hardware support for nested virtualization. Ford et al. [13] implemented nested VMs in a microkernel environment. Graf and Roedel [18] and Ben-Yehuda et al. [7] implemented nested VM support in the KVM [23] hypervisor on AMDV [1] and Intel VMX [42] platforms respectively. Unlike IBM z/VM, these rely on only a single level of hardware virtualization support. Prior nested VM platforms restrict the L2 VM to execute on a single L1 hypervisor at a time. Although one can technically live migrate [11, 19] an L2 VM from one L1 hypervisor to another, the "one-hypervisor-at-a-time" restriction still applies. None of the prior approaches allow a single L2 VM to execute simultaneously on multiple L1 hypervisors on the same physical machine.

Distributed operating systems, such as Amoeba [36, 2] and Sprite [22], aim to aggregate the resources of multiple networked machines into a single pool. ScaleMP [43] is a commercial system that provides a distributed hypervisor spanning multiple physical machines, to transparently support SMP VMs, and also supports nested VMs via a feature called VM-on-VM, but does not appear to support multi-hypervisor VMs. Further, being a proprietary product, very few implementation details are available. DVM [38] implements a distributed virtual machine service for the Java platform by moving system services such as verification, security enforcement, compilation and optimization, out of the client into central servers. In contrast to such systems that aggregate resources across multiple physical machines, the present technology, called Span, transparently supports nested VMs that span multiple co-located L1 hypervisors.

A related line of research relates to dis-aggregating the large administrative domain [25, 12, 10, 40] typically associated with a hypervisor, such as Domain 0 in Xen. The goal of these efforts is to replace a single large administrative domain with several small sub-domains (akin to privileged service-VMs) that are more resilient to attacks and failures, better isolated from others, and can be customized on a per-VM basis. Thus a VM could pick and choose the services of specific sub-domains which run at the same level as the VM atop the common hypervisor. In contrast to prior efforts, the present technology supports running a VM simultaneously on multiple lower-level hypervisors, each of which could possibly offer specialized hypervisor-level services.

As only L0 can execute in the highest privileged mode, all privileged instructions executed by L1 and L2 are trapped by L0. This same hierarchical constraint would generally apply to a deeper set of hypervisors: each hypervisor can execute with no further privilege than its parent, and typically, certain privileges are reserved to the parent or L0 and denied to the child, thus functionally distinguishing the layers.

SUMMARY OF THE INVENTION

The present technology provides a multi-hypervisor virtual machine (MHVM) that enables a VM to simultaneously execute on multiple co-located hypervisors by leveraging virtualization.

The present technology enables cloud providers to co-locate multiple third-party hypervisors that provide different services on the same physical machine. A VM can thus simultaneously use the diverse L1 services such as VM introspection, intrusion detection, deduplication, or real-time CPU or I/O scheduling. A new cloud architecture is provided in which cloud providers can enable third parties to execute multiple-independently developed or maintained-hypervisors, each contributing different features. Indeed, because a VM can employ multiple hypervisors, new hypervisor may be provided which provides only new functions, and may rely on another hypervisor platform or platforms for complete support of execution by the VM. Therefore, VMs may be modular, and may be provided as a set of optional alternates.

Lean hypervisors are therefore possible that specialize in providing specific services. VMs could then pick and choose any (and only the) hypervisors they need.

Even hypervisors from a single source may have different versions, which may impose compatibility issues with respect to legacy code. Therefore, the present technology permits these various hypervisors to coexist and concurrently operate.

A multi-hypervisor virtual machine is provided, according to the present technology, as an L2 VM that can simultaneously run on multiple hypervisors. FIG. 1 shows a high-level illustration of various possibilities. A single L0 hypervisor runs multiple L1 hypervisors (H1, H2, H3, and H4) and multiple L2 VMs (V1, V2, V3 and V4). V1 is a traditional nested VM that runs on only one hypervisor (H1). The rest are multi-hypervisor VMs. V2 runs on two hypervisors (H1 and H2). V3 runs on three hypervisors (H2, H3, and H4). V4 runs in a hybrid mode on H4 and L0.

A multi-hypervisor VM, e.g., a L2 VM, is considered to simultaneously "run" on multiple L1 hypervisors when the underlying L1 hypervisors (a) share the memory image of the L2 VM, (b) optionally partition the responsibility for scheduling its virtual CPUs (VCPUs), and (c) optionally partition the responsibility for servicing I/O requests at a device-level granularity. FIG. 2 illustrates this definition for an L2 VM running on two L1 hypervisors (as in V2).

Note that the VCPUs and virtual I/O devices of the L2 VM could be asymmetrically distributed across L1 hypervisors. For example, in FIG. 2, alternatively three VCPUs could be assigned to Hypervisor 1 and one to Hypervisor 2; or even all to the former and none to the latter. Further note that the I/O responsibility may be partitioned among L1 hypervisors only if the VCPUs are partitioned. For example, if Hypervisor 1 handles all the VCPUs of the L2 VM, then Hypervisor 2 is automatically excluded from relaying I/O requests or delivering device interrupts on behalf of the L2 VM.

The present technology enables cloud users to run guest VMs simultaneously on multiple colocated, but isolated, hypervisors. Cloud providers execute the hypervisors, each potentially developed and/or maintained by a different entity, and each exposing one or more hypervisor-level features the cloud user.

The Span technology provides a feasible multi-hypervisor VM, and provides systems support for an L2 VM that simultaneously runs on two L1 KVM hypervisors (as in V2). This two-hypervisor L2 VM (henceforth called Span VM) runs an unmodified guest operating system. All systems support is implemented entirely in the L0 and L1 hypervisors. A Span VM's memory image is shared, and its VCPU state and I/O activity distributed, across two L1s. Using macro and micro benchmarks, a Span VM has been demonstrated to achieve performance comparable to traditional VMs.

Span is not limited to only two L1 hypervisors, and can readily support more than two (V3), and support a hybrid L1-L0 mode (V4).

The benchmarked prototype uses the shadow-on-EPT [7] memory translation mechanism in KVM. However, other EPT translation mechanisms may be supported, for example, a more efficient nested EPT [27] translation mechanism which was recently added to mainline KVM. The use of shadow-on-EPT significantly limits the performance of Span VMs (just as it does for standard nested VMs) due to the large overhead of handling L2 VM Exits.

Span VMs presently run with virtio devices [34], but can be implemented to support direct device assignment and Single Root I/O Virtualization and Sharing (SR-IOV) [8, 9, 30]. The use of virtio negatively impacts the I/O performance of the benchmarked system, and therefore a direct-device assignment to L1 hypervisors would have improved performance.

Finally, both L1 hypervisors presently run KVM. Main Linux/KVM releases do not fully support non-KVM hypervisors as L1 guests [44], although there is some anecdotal evidence of attempts to run legacy Xen as an L1 guest on KVM. Even though both L1 s presently run KVM, each could potentially offer different services to Span VMs, such as an intrusion detection system or a VM introspection system running in one L1 while the other L1 performs standard resource management.

According to the present technology, the multiple hypervisors are provided with distinct levels of privilege or restrictions within the operating environment, distinct from their functionality. In some cases, the VM may execute on various hypervisors that have different respective privileges and/or security models. It is also possible for the VMs to execute on distinct hardware.

The Span technology may also be used in conjunction with other technologies, such as swapping, virtual memory schemes, live migration, and the like.

It is therefore an object to provide a multi-hypervisor VM which can simultaneously run on multiple L1 hypervisors. The latter can co-exist in an ecosystem providing diverse hypervisor-level services.

It is a further object to provide a multi-hypervisor VM that simultaneously uses services from two KVM L1 hypervisors, each offering different services.

It is another object to provide a multi-hypervisor virtual machine, comprising: a unitary host machine; a virtual machine which relies on at least two concurrently available hypervisors to interface with the physical host system; and at least two hypervisors, the virtual machine being configured to concurrently communicate with the at least two hypervisors to execute on the unitary host machine.

It is a further object to provide a method for providing multiple hypervisors for a virtual machine, comprising: providing a unitary host machine; providing at least two hypervisors which are concurrently available and independently execute on the unitary host machine; and executing a virtual machine which relies on the at least two concurrently available hypervisors to interface with the physical host system, the virtual machine having a memory map which has portions accessible by each of the at least two hypervisors.

It is another object to provide a method for providing multiple hypervisors for a virtual machine, comprising: providing a virtual machine supporting execution of a guest operating system and having a memory map, the guest operating system supporting execution of applications, on hardware resources of a unitary host machine; providing at least two concurrently available and independently executing hypervisors which interface the virtual machine to the unitary host machine, the at least two hypervisors each having access to at least a respective portion of the memory map; performing a first action by the virtual machine which employs resources provided by a first hypervisor of the at least two concurrently available and independently executing hypervisors; performing a second action by the virtual machine which employs resources provided by a second hypervisor of the at least two concurrently available and independently executing hypervisors; and servicing at least one input/output request of the virtual machine by the first hypervisor, substantially without interference by the second hypervisor.

According to various aspects, one hypervisor may be hierarchically inferior to another hypervisor. According to another aspect, the at least two hypervisors may be at a common hierarchical level. The hypervisors may have respectively different execution privilege, even if at the same hierarchical level.

The existence of the at least two hypervisors may be transparent to a guest operating system which executes on the virtual machine. An operating system and applications of the virtual machine may execute substantially without explicit control over the selection of respective hypervisor actions.

The at least two hypervisors share a common memory image of the virtual machine. The memory map associated with the virtual machine for each of the at least two hypervisors may be identical. The memory map associated with the virtual machine may be associated exclusively with a single hypervisor. A plurality of hypervisors may partition responsibility for scheduling at least one respective virtual central processing unit.

The at least two hypervisors may each be respectively associated with a different number of virtual central processing units. The at least two hypervisors may offer different services to the virtual machine.

A single hypervisor associated with a virtual central processing unit may be selected for relaying input/output requests from other hypervisors.

A single hypervisor associated with a virtual central processing unit may be is selected for delivering device interrupts to other hypervisors.

A single hypervisor associated with a virtual central processing unit may be selected for delivering device interrupts to the virtual machine on behalf other hypervisors.

A plurality of virtual machines may be provided, wherein a plurality of virtual machines each relies on at least two concurrently available hypervisors to interface with the physical host system. Responsibility for servicing input/output requests of the virtual machine may be partitioned at a device-level granularity among a plurality of hypervisors.

A single hypervisor controlling a virtual central processing unit of the virtual machine may be selected for relaying input/output requests generated from the virtual machine on at least one other virtual central processing unit controlled by another hypervisor.

A single hypervisor may be selected for relaying device interrupts to another hypervisor for delivery to a virtual central processing unit of the virtual machine controlled by the other hypervisor. The device interrupts may be generated by at least one hardware device, and delivered to a respective virtual central processing unit of the virtual machine per an interrupt affinity specified by a guest operating system executing in the virtual machine.

A single hypervisor may be selected for relaying device interrupts on behalf of at least one other hypervisor controlling at least one virtual central processing unit of the virtual machine.

The virtual machine may be configured to execute a guest operating system which supports a polling mode driver for receiving communications from the at least one hypervisor substantially without interrupts.

One hypervisor may have exclusive control over at least a portion of the memory map.

The various hypervisors have respectively different operating privileges.

DETAILED DESCRIPTION OF THE PREFERRED EMBODIMENTS

Design and Implementation

An important design requirement is transparency for the Span VM, i.e. the L2 guest kernel and applications should remain unmodified and oblivious to the fact that two L1 hypervisors and the L0 hypervisor coordinate its initialization and runtime management. There are four aspects to consider in the design of Span VMs: (1) Initialization, (2) Memory management, (3) VCPU distribution and scheduling, and (4) I/O processing.

Initialization of Span VMs

The goal of initialization step is to have a single Span VM running under the control of two L1 hypervisors. A Span VM is initiated as a regular L2 VM at one of the L1 hypervisors, called the L1 source. The second L1 hypervisor, called the L1 target, also initiates its own instance of an L2 VM, but maps the L2 memory, VCPU and I/O device states to that initialized by L1 source. The two instances of L2 VMs are referred to as sub-VMs of the Span VM. Once the initialization is complete, L1 source and L1 target work as peers in managing the Span VM.

The three major initialization steps are (a) sharing the Span VM's memory, (b) distributing Span VM's VCPUs, and (c) distributing Span VM's virtual I/O devices, across L1 source and L1 target.

Memory Initialization and Runtime Management

Figure 1:
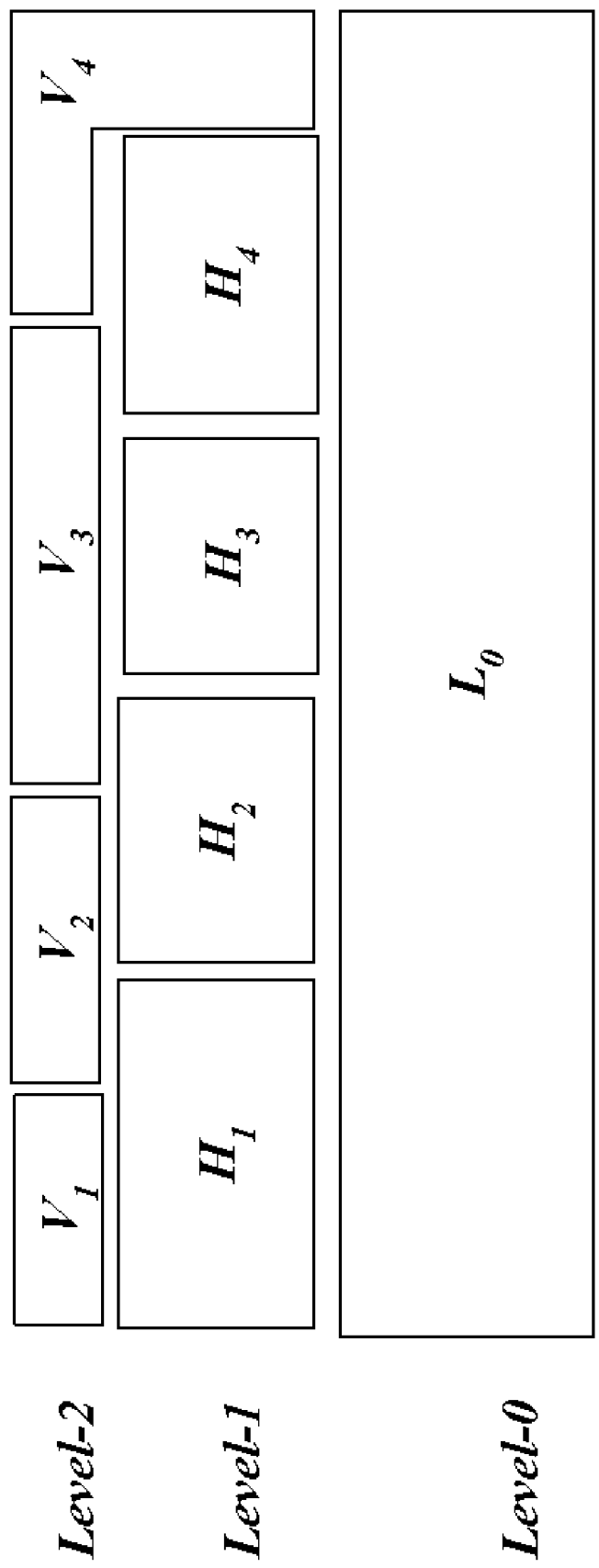
FIG. 1 shows Multi-hypervisor Virtual Machines, in which L0 is the level-0 hypervisor. H1, H2, H3, and H4 are level-1 hypervisors that run on L0. V1, V2, V3, and V4 are level-2 VMs. V1 runs on H1. V2 runs on H1 and H2. V3 runs on H2, H3, and H4. V4 runs on H4, and L0.
Figure 2:
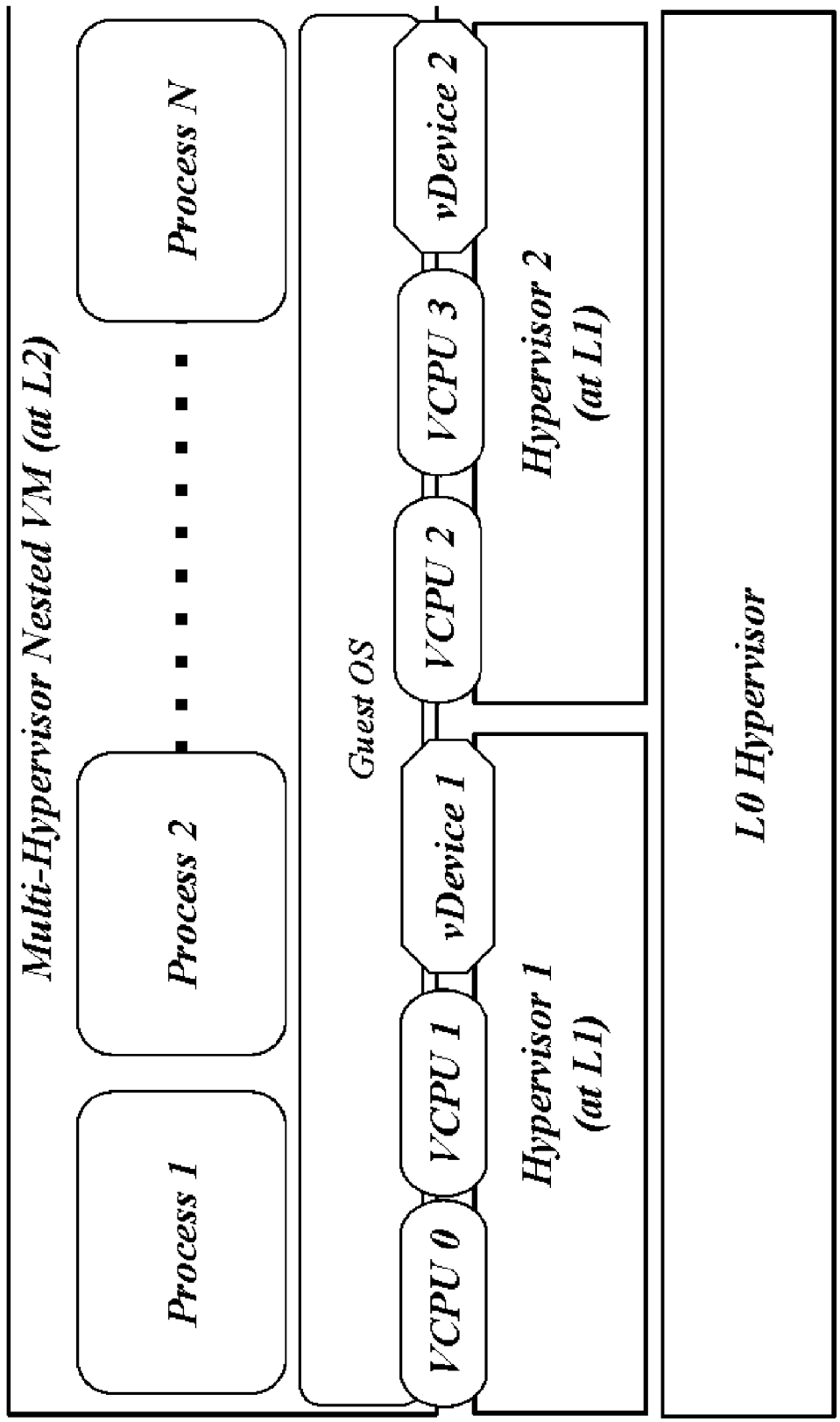
FIG. 2 shows resource distribution in Multi-hypervisor Virtual Machines; the Memory of the L2 VM is shared across the two L1 hypervisors, whereas its VCPUs and virtual devices may be distributed.
Figure 3:
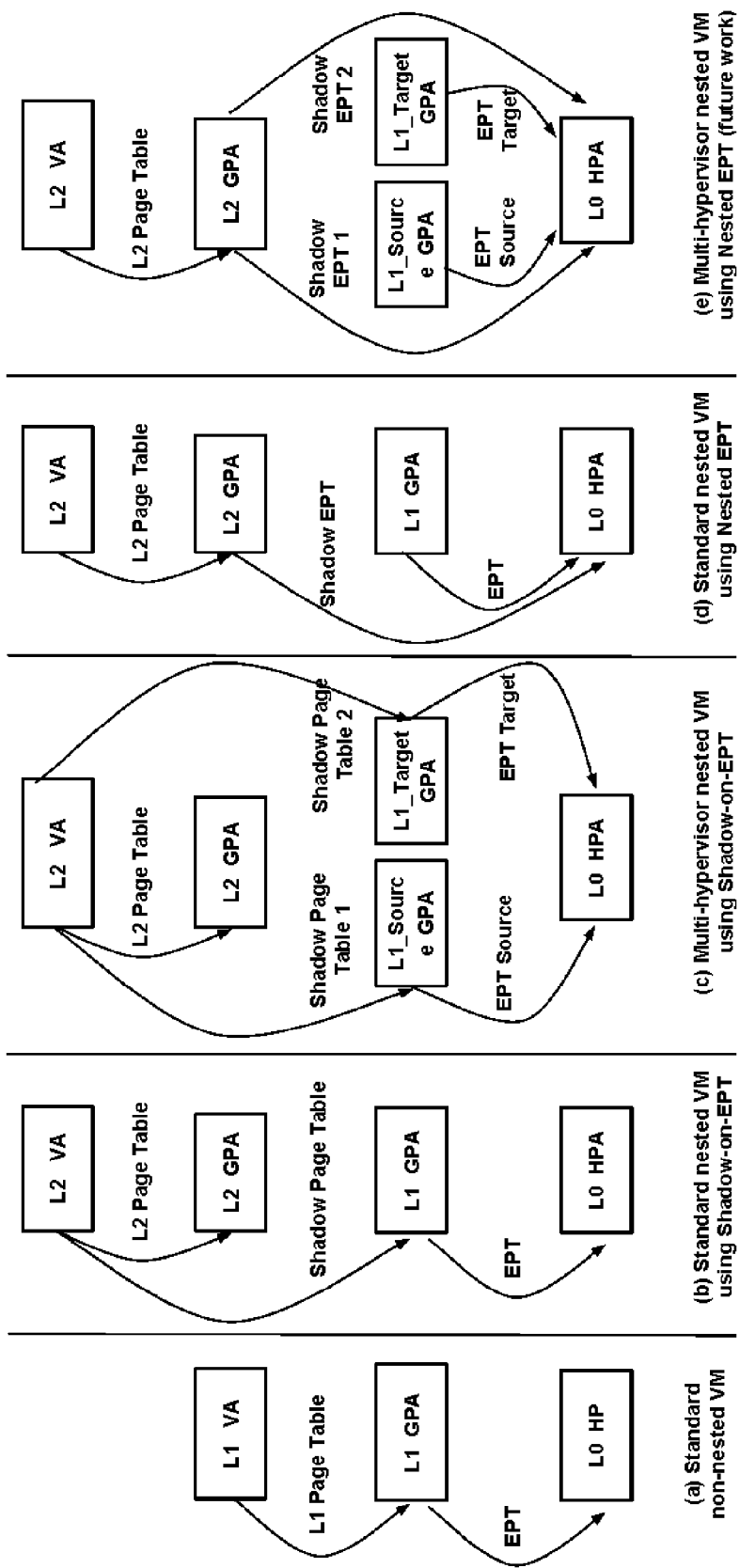
FIG. 3 shows memory translation in non-nested, traditional nested, and multi-hypervisor VM.

Consider memory translation in non-nested VMs, i.e. an L1 VM, as shown in FIG. 3(a). As each page is accessed for the first time by the L1 VM during runtime, the corresponding accesses are trapped and physical memory pages are assigned by the L0 hypervisor's memory management subsystem. Subsequent accesses to an already allocated L1 virtual address (VA) are translated using hardware-level page table support. Specifically, an L1 VA is first translated to the L1 guest physical address (GPA) and then to the L0 host physical address (HPA).

For standard nested VMs and Span VMs, as shown in FIG. 3(b), there are two possible configurations for memory translation[7]: (1) shadow-on-EPT and (2) nested EPT (also called multi-dimensional paging in [7]). The nested EPT configuration is more efficient performance-wise [27, 44], and therefore may be preferred for that and other reasons.

3.2.1 Shadow-on-EPT Configuration

FIG. 3(b) shows the memory translation for standard nested VMs using shadow-on-EPT configuration. When a page is allocated for the first time, its page mappings must be updated in both L1 and L0 hypervisors. Specifically, during runtime, an additional shadow page table in the L1 hypervisor translates from the L2 VA to the L1 GPA by compressing the translation (L2 VA)→(L2 GPA)→(L1

GPA). L1 GPA is then translated to L0 HPA using a second-level page table (i.e. EPT for Intel VT-x or NPT for AMD-V).

FIG. 3(c) shows memory translation for Span VMs using shadow-on-EPT configuration. The memory initialization step lays the groundwork to ensure that an L2 VA is translated to the same HPA irrespective of whether the VA is accessed from the sub-VM at L1 source or the one at L1 target. In other words, an L2 VA must lead to the same HPA irrespective of the translation route, i.e. (L2 VA)→(L1 source GPA)→(L0 HPA) or (L2 VA)→(L1 target GPA)→(L0 HPA). Since each L2 VA that is accessed via the two sub-VMs leads to the same HPA, any memory write performed by the sub-VM at L1 source is immediately visible to the sub-VM at L1 target' and vice versa. Thus the two sub-VMs behave as if they are part of a single Span VM at the L2 level.

L0 needs to know which L1 GPAs are allocated for the L2 sub-VMs by each L1 hypervisor so that L0 can map the corresponding L1 GPAs to same HPAs. When instantiating their respective sub-VMs, both L1 hypervisors set aside requisite number of pages in their GPA space for the Span VM. (These pages do not need to be contiguous, but the benchmarked implementation allocates them in 4 MB chunks.) Both L1s then notify the identity of these reserved GPA pages to the L0 hypervisor via hypercalls. The L0 hypervisor ensures during runtime that the two reserved GPA spaces map to the same HPA space. In other words, if a physical page is allocated for a GPA reserved in L1 source' then the corresponding page for the GPA reserved in L1 target is mapped to the same physical page, and vice versa.

While it may appear inefficient at the first sight to reserve L1 GPA space equal to the size of Span VM's memory, note that the reservation is only in the L1 GPA space; no physical memory is allocated for the Span VM until the respective L2 VAs are first written to. Reserving L1 GPA simplifies the implementation by eliminating the chance of exhausting L1 GPA space during runtime Physical memory allocation for the Span VM occurs when it writes to an L2 VA for the first time during runtime. Since unallocated VAs are backed by anonymous pages, a first-time write to a VA results in a page fault. If the first level translation, i.e. (L2 VA)→(L1 GPA), is missing in the shadow page table, then the L1 hypervisor assigns a page from the reserved GPA space to the faulting L2 VA.

When the L0 hypervisor handles a missing second-level address translation, i.e. (L1 GPA)→(L0 HPA), from L1 source' it first checks whether the faulting L1 GPA belongs to a reserved GPA space for the sub-VM at L1 source. If so, and if a physical page was already allocated to L1 target for the corresponding L1 GPA, then L0 maps the same physical page to the faulting L1 GPA in L1 source. Else a new physical page is allocated to the faulting L1 GPA. Conversely, if L1 target faults on a L1 GPA reserved for its L2 sub-VM, then L0 attempts to locate and map the corresponding physical page allocated to L1 source. Thus the runtime page allocation is symmetrical whether the initial page access happens from L1 source or L1 target.

Concurrent page faults: Finally, consider two L2 VCPUs in two different sub-VMs (on different L1s) running on two different physical CPUs, that fault on access to the same L2 page at the same time. In this case, the Span-specific code in the L0 hypervisor serializes any concurrent updates to the EPT translation for both L1s. In other words, if the (L1 GPA)→(L0 HPA) mapping doesn't exist for the faulting page in both L1s, then the L0 hypervisor ensures that the page-fault handlers for both faults map the two faulting L1 GPAs to the same HPA. However, if at least one EPT-level translation exists for the concurrently faulting L2 page, then any other missing translations (namely either of the first-level shadow page table translations or the peer EPT translation) can be processed normally without any coordination between the two L1s.

Nested EPT Configuration

FIG. 3(d) shows the memory translation in standard nested VMs using nested EPT configuration. As with shadow-on-EPT configuration, the first-time that a page needs to be allocated, the page mappings must be updated in both L1 and L0 hypervisors. However, instead of constructing a shadow page table in the L1 hypervisor that translates from the L2 VA to the L1 GPA, the nested EPT configuration constructs a "shadow EPT" in L0 that translates from L2 GPA to L0 HPA. This is achieved by compressing the lower two levels of translation (L2 GPA)→(L1 GPA)→(L0 GPA). Performance-wise, this configuration is more efficient than shadow-on-EPT because the (L2 GPA)→(L1 GPA) mapping changes less frequently than the (L2 VA)→(L2 GPA) mapping. Hence fewer VM Exits, world switches, and redirections through the L0 hypervisor are needed to maintain the shadow EPT. FIG. 3(e) shows a memory translation mechanism in Span VMs that will use nested EPT configuration. During initialization, as before, each L1 hypervisor will reserve L1 GPA space for the L2 sub-VMs, but no physical memory will be allocated. During runtime, page faults are handled as follows. If the first level translation, i.e. (L2 VA)→(L2 GPA), is missing then let the L2 guest assign an L2 GPA page. If the second level translation (L2 GPA)→(L0 GPA) is missing in the shadow EPT constructed via (say) L1 source' then L0 first lets L1 source to populate the internal mapping (L2 GPA)→(L1 GPA) by using a page from its reserved L1 GPA space for the corresponding L2 sub-VM. Next, if a physical page was already allocated to L1 target for the corresponding L1 GPA, then L0 will map the same physical to L1 source' else a new physical page will be allocated. Conversely, if the fault relates to a missing shadow EPT entry via L1 target then L0 will try to locate and map the corresponding physical page allocated to L1 source. Regardless, the two shadow EPTs constructed via either L1 will finally translate a given L2 GPA to the same HPA. However, the two shadow EPTs won't necessarily be identical at any instant since each L2 sub-VM may access a different subset of L2 GPA space, populating different shadow-EPT entries.

Concurrent page faults will be handled as in the case of shadow-on-EPT configuration; L0 will serialize any concurrent attempts via different sub-VMs (on different L1s) to update the shadow EPT entries for the same L2 GPA.

VCPU Distribution and Scheduling

"VCPU distribution" for a Span VM refers to the fact that the virtual CPU (or VCPU) is a logical representation of a physical CPU (PCPU) and is exported from a hypervisor to a VM. Informally, this logical representation consists of a program counter and its associated execution context (registers, stack pointer, etc). The number of VCPUs seen by a VM could be more, equal, or less than the number of PCPUs in the machine. A hypervisor manages VCPUs in two ways: through spatial scheduling (VCPU-to-PCPU assignment) and through temporal scheduling (when and how long does a VCPU remain mapped to a PCPU).

A Span VM can "run" on two (or more) L1 hypervisors simultaneously, that is, the responsibility for temporal and spatial scheduling of Span VM's VCPUs is distributed among the two underlying hypervisors. The L2 VCPU may be controlled entirely (i.e. both spatially and temporally) by one L1 hypervisor during the lifetime of the Span VM.

The initialization step determines which L2 VCPU of the Span VM is controlled by which L1 hypervisor. The distribution of VCPUs could be equal, where each L1 hypervisor controls the same number of VCPUs, or it could be unequal, where different L1 hypervisors may control different number of VCPUs. For example, if the Span VM is configured to have 4 VCPUs, then after the initialization step, 2 VCPUs could execute on L1 source and 2 VCPUs could execute on L1 target. Alternatively, the VCPU distribution could also be 3 and 1, 1 and 3, 4 and 0, or 0 and 4. The last two distributions would imply pure memory mapping and no VCPU control at one of the L1s.

A preferred approach for distributing the VCPUs of the Span VMs is as follows. The L1 source begins by initiating its L2 sub-VM, initializes the memory state as described above, and initializes all the VCPUs of the Span VMs as it would for regular nested VMs. Once the guest OS in the L2 sub-VM boots up, L1 source hands over the control of scheduling a subset of the L2 VCPUs to L1 target. Thus L1 target does not initialize any VCPUs from scratch its L2 sub-VM; rather it accepts a preinitialized subset of VCPUs from L1 source. For example, if the Span VM is configured with two VCPUs, then after the VCPU distribution step, one VCPU will be active on L1 source and the second will be active on L1 target. The transfer of VCPU state is achieved by using a variant of the VM migration logic, wherein only the VCPU and device states are transferred, but memory transfer is skipped (since L2 memory is already shared across L1 source and L1 target).

Implementation-wise, QEMU represents VCPUs as user space threads. Hence, to split the responsibility of executing L2 VCPUs across different L1 hypervisors, the execution of complementary set of threads in the corresponding L1 QEMU processes may be paused. During initialization, the VCPU state is transferred from L1 source to L1 target by modifying the existing pre-copy QEMU migration code. After VCPU state is transferred, complementary set of the QEMU VCPU threads are paused on either side.

The guest OS in the Span VM will try to schedule its work (threads/processes/interrupt handlers) on all of the VCPUs that it sees, subject to affinity rules configured by the administrator (such as process affinity or IRQ affinity). A process/thread within a guest OS can be generally migrated from one VCPU to another, except in cases when some of them may be pinned to certain VCPUs. Similarly, an interrupt handler can execute on any VCPU allowed by IRQ affinity configuration.

One of the issues in the Span VM design is about what happens when the L2 guest OS tries to migrate a process from one L2 VCPU running on, say, L1 source to another L2 VCPU running on L1 target. Keep in mind that the socalled "migration" of a process from one VCPU to another basically boils down to moving the process task structure (task struct in Linux) from the ready queue of one VCPU to that of another. So moving a process across VCPUs should just be an update operation on kernel data structures that are kept in the L2 guest's main memory. Ideally, the existing scheduling mechanisms in the guest OS for changing VCPU assignment for processes should work inside a Span VM as well. However, there are subtle architecture-level issues such as flushing stale TLB entries for the migrating process from the old VCPU, which requires an inter-processor interrupt (IPI) from the new VCPU to the old VCPU. In the above example, these IPIs and any similar notifications would need to be forwarded from one L1 to another when an L2 process is migrated across sub-VM boundaries.

Consider what happens when concurrently executing VCPUs on different hypervisors attempt to access (read/write) common memory locations (such as kernel data structures). The Span VM's memory image typically resides in the DRAM of a single machine. So it is acceptable if two different VCPUs controlled by two different hypervisors access common memory locations. All existing locking mechanisms in the L2 guest would work correctly because the locks themselves are stored in the L2 main memory. Thus memory consistency is not compromised by distributing L2 VCPUs over multiple L1s because the L2 main memory is shared by L1 source and L1 target.

I/O Processing in Span VMs

The I/O subsystem for a VM can be configured in one of three modes: device emulation [41], para-virtual devices [34, 3], or direct assignment [8, 9, 30]. Paravirtual devices perform better than device emulation. Direct assignment, including SR-IOV [30], yields the best performance, since it allows a VM to bypass intermediate software layers while interacting with the I/O device.

I/O processing in Span VMs needs to account for the fact that a single L2 VM is now associated with two L1 hypervisors. Three design options are (a) to allow both hypervisors to manage all of L2's I/O devices, or (b) to delegate the control of each I/O device belonging to L2 to one of the two L1 hypervisors, or (c) to allow the L2 VM to directly control its I/O devices. Option (a) is very complicated to implement due to the need to manage concurrency and device control while providing little functional benefits. Option (b) is simpler, but requires coordination among the two L1s. Option (c) is the simplest, provided that hardware and hypervisor-level support is available.

A prototype was implemented using Option (b), delegating the I/O control to a single L1 hypervisor using paravirtual virtio drivers [34].

Virtio Overview

Figure 4:
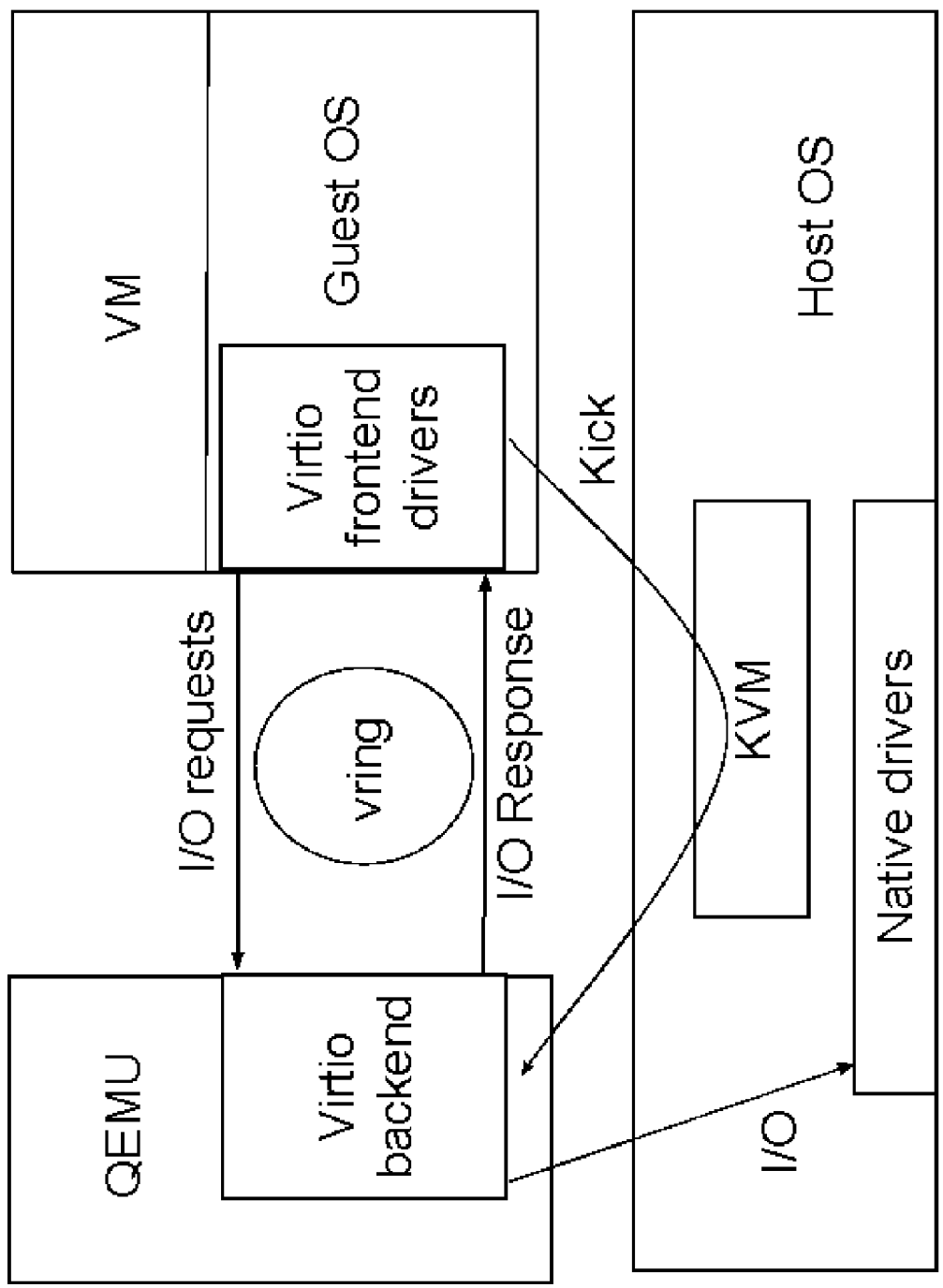
FIG. 4 shows an overview of virtio architecture.

FIG. 4 shows the high level overview of standard virtio architecture. The guest OS in the VM runs paravirtual frontend drivers, such as for virtual block and network devices. The QEMU process hosts the corresponding virtio backends. The frontend and the backend exchange I/O requests and responses via a vring, which is basically a shared buffer. When an I/O request is placed in the vring, the frontend notifies QEMU through a kick operation, i.e. is a trap leading to VM Exit. The kick is redirected to QEMU via the KVM kernel module. The QEMU process retrieves the I/O request from the vring, issues the request to the native drivers as an asynchronous I/O. Once the I/O operation completes, QEMU injects an I/O completion interrupt to the guest OS. When the VM resumes, the I/O completion interrupt is delivered to a VCPU according to the IRQ affinity rules in the guest OS. The interrupt handler in the guest invokes the frontend driver, which picks up the I/O response from the vring.

The Multiple Backend Problem

Figure 5:
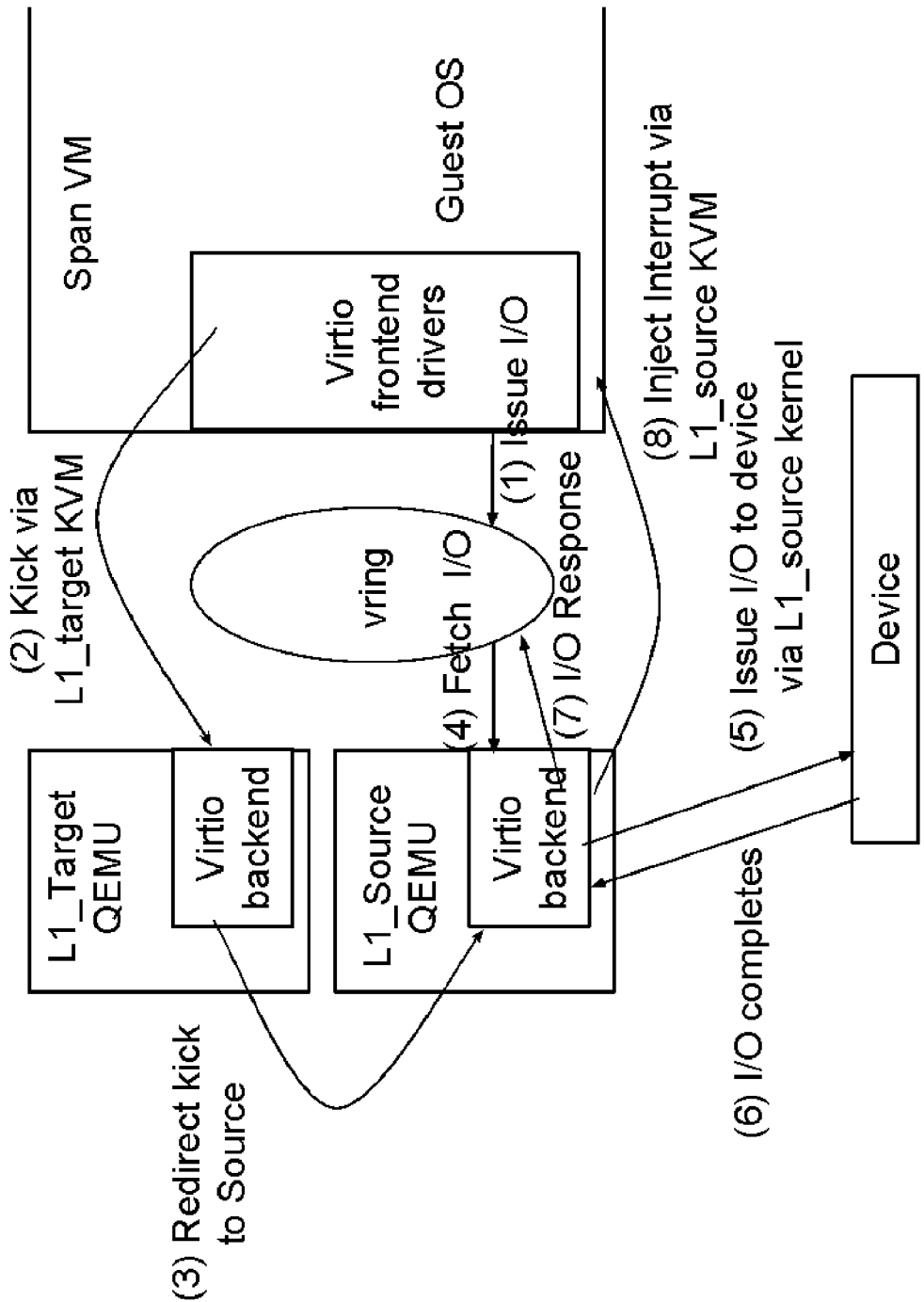
FIG. 5 shows virtio operation with Span VMs, in which kicks generated by Span VM at the L1 target are redirected to QEMU at L1 source.

The first problem relates to the fact that, since a Span VM runs on two L1 hypervisors, it is associated with two QEMU processes, one on L1 source and another on L1 target' as shown in FIG. 5. Thus a single virtio frontend with one vring is now associated with two virtio backends. If both virtio backends access the vring concurrently, race conditions would result in corruption of the vring buffers. To solve this problem, only one virtio backend is allowed to pick up I/O requests and deliver I/O responses through the vring. So, for example, assume that the virtio backend at the L1 source is configured to interact with the vring. If an L2 VCPU running at L1 source issues an I/O request, then the corresponding kick will be handled by L1 source QEMU. However, if an L2 VCPU running at the L1 target issues an I/O request, then the corresponding kick will be redirected to the QEMU at L1 target. The backend in L1 target QEMU will not access the vring to fetch the I/O request. Instead, the QEMU backend at L1 target is modified so that it redirects the kick one more time to the QEMU at L1 source. At this point, the QEMU backend at the L1 source fetches the I/O request from the vring and processes the request via asynchronous I/O. Once the I/O completes, the L1 source QEMU injects an I/O completion interrupt into the guest to notify the frontend.

The benchmarked prototype uses two virtio serial devices exported from the L0 to each L1 in order to redirect the virtio kick information across L1 s; this mechanism could be replaced by a more efficient channel, such as shared memory. Also note that presently it is unnecessary to synchronize the L2's IOAPIC state across L1 boundaries because only one L1 is designated to handle each I/O device for L2, and frontend kicks are forwarded to the designated L1. Thus, it is acceptable even if the L2's IOAPIC state maintained within the two L1s are not synchronized because only the designated L1's IOAPIC state is relevant for an L2 I/O device.

Lost Interrupt

The second problem relates to the fact that each L1 suppresses complementary set of VCPUs for L2 for VCPU distribution and this could interact negatively with I/O interrupt processing. For simplicity, assume that L1 has two VCPUs—L1 source runs VCPU0 and pauses VCPU1 whereas L1 target runs VCPU1 and pauses VCPU0. Assume that IRQ affinity rules in the L2 guest permit I/O interrupt delivery to both VCPU0 and VCPU1. Let's say an I/O operation completes on L1 source. KVM in L1 source would follow the affinity rules and inject the I/O completion interrupt to VCPU1. Since VCPU1 is suppressed on L1 source' the interrupt would never be processed by L2 guest, and the I/O would never complete.

To solve this problem, the IOAPIC code in both L1 KVMs is modified to deliver interrupts only to L2 VCPUs that are not suppressed (active) in the corresponding L1. While this may temporarily override IRQ affinity settings in the L2 guest, it prevents the problem of lost interrupts. If any L2 guest requires the IRQ affinity settings to be honored for correct operations, then an alternative is to redirect L2 interrupts from one L1 to another when needed. This is optional, and not implemented in the benchmarked prototype.

Network Receive

The above described solutions works as is for read and write requests on virtio-blk device and packet send requests on virtio-net device. For packet receive operations on virtio-net device, an additional complication arises. The Span VM has only one network identity (IP address, MAC address). Assume that a bridged mode network configuration is employed, where a software bridge in L0 determines where each incoming packet should be delivered. For Span VM, incoming packets could be delivered through either L1 source or L1 target. Which path the L0 software bridge chooses depends upon the reverse learning algorithm. If outgoing packets from Span VM consistently exit through L1 source then incoming packets will be delivered through L1 source as well. Likewise for L1 target. However, if outgoing packets switch back and forth between L1 source and L1 target as exit paths, then the L0 software bridge may simply broadcast the incoming packets for Span VM to both paths, which would lead to duplicate packet deliveries to Span VM. To avoid this problem, the outgoing packets from Span VM may be forcibly restricted to exit via only a designated L1 (say L1 source for the sake of discussion) and not the other. As a result, the reverse learning L0 software bridge would deliver any incoming packets for L2 (and the corresponding RX interrupts) only to L1 source from where all outgoing packets exit. L1 source in turn injects the RX interrupt to one of the active VCPUs of the L2 sub-VM that it hosts; it does not need to forward the RX interrupt to L1 target even if the destination L2 VCPU for the packet is running on L1 target.

Polling Driver Alternative

To avoid the multiple backend and lost interrupt problems described above for block devices, an alternative solution was implemented in which virtio-blk device was converted into a polling mode driver. Once the virtio block device is created, a QEMU thread is created to check the available ring whether there are requests from the L2 guest. If there are available requests, the QEMU backend pops the requests from available ring, and submits the requests to I/O threads in QEMU. The callback functions do not inject interrupts into the L2 guest. On L2 guest side, once a virtio block device is detected, the front-end driver creates a kernel thread to keep checking whether there are finished requests in the used ring from the backend. If so, the kernel thread will wake up the waiting process. While this approach avoided the above two problems, the CPU overhead of the polling mode driver was too high, on top of shadow-on-EPT nested virtualization overheads.

Inter-Processor Interrupts

In addition to redirecting I/O kicks from QEMU, any inter-processor interrupts (IPIs) that are issued from a VCPU on one L1 are redirected to a VCPU on another, such as to deliver a TLB flush when migrating L2 processes across L2 VCPUs. In standard nested VMs, IPIs between VCPUs are intercepted and delivered by the KVM module. If the sender and the target VCPUs of the IPI are on the same physical CPU, then when the next time the target VCPU switches to guest mode, the injected IPI will be triggered. If the target VCPU is in guest mode, a reschedule IPI message will be sent to the target physical CPU where the VCPU is running in guest mode, which will cause a VM exit, when the next time the target VCPU enters guest mode, the injected IPI will be found by the guest.

For Span VMs, cross-L1 IPIs are transferred. For example, if an IPI from an L2 VCPU running on L1 source is meant for an L2 VCPU running on L1 target then KVM at L1 source transfers the IPI information to the KVM at L1 target' which then injects the IPI into the target L2 VCPU. Again, the benchmarked prototype uses serial virtio devices exported from L0 to L1 to transfer IPIs across L1 s; this mechanism could be replaced by a more efficient channel, such as shared memory.

Evaluation

The evaluation compares macro benchmark performance of Span VMs against standard nested VMs and measures low-level sources of overheads in Span using micro benchmarks.

The evaluation setup consists of a dual quad-core Intel Xeon 2.27 GHz server with 70 GB memory running Ubuntu 9.04 with Linux kernel version 2.6.32.10. The hypervisor running on the host is qemu-kvm-1.0 and kvmkmod-3.2. For both L1 source and L1 target guests, an Ubuntu 10.04 guest with kernel version 3.2.2 was used. Each L1 is configured with 4 GB memory and two VCPUs. The hypervisors running on both L1 guests are qemu-kvm-1.2 and kvmkmod-3.2. Ubuntu 10.04 with kernel version 2.6.28-generic was used for the nested and Span VMs, both of which are configured with two VCPUS and 2 GB memory.

Macro Benchmarks

The performance of two CPUintensive benchmarks, namely Kernbench [24] and SPECjbb2005 [39] were measured Kernbench measures the time taken when repeatedly compiling the Linux kernel. Kernbench is primarily a CPU and memory intensive benchmark but also performs I/O to read and write files. Kernbench was tested with the default configuration options and averaged over the results over three runs. SPECjbb2005 measures the server-side performance of Java runtime environments. The benchmark emulates a 3-tier system, which is the most common type of server-side Java application. SPECjbb2005 measures business operations per seconds (bops) by averaging the total transaction rate in a run from the expected peak number of warehouses. SPECjbb2005 is primarily a CPU-intensive benchmark. Kernbench and SPECjbb2005 were run in four different settings. For accurate comparison, each setting ran the benchmarks with the same number of CPUs and memory.

1. Host with two physical CPUs.

2. L1 guest with two VCPUs running on an L0 with eight physical CPUs.

3. L2 guest with two VCPUs running on L1 with two VCPUs running on L0 with eight physical CPUs.

4. L2 Span guest with two VCPUs running on two L1s which each having two VCPUs and running on a L0 with eight physical CPUs.

Table 1 for Kernbench shows that Span VM incurs 6.3% overhead compared to the traditional nested VM, 361.2% overhead compared to L1, and 395.6% overhead compared to host. Table 2 for SPECjbb2005 shows that Span VM has 1.3% performance degradation compared to the standard nested VM, 6.4% performance degradation compared to L1, 23.8% compared to host. Thus Span VM performs comparably against standard nested VMs for both Kernbench and SPECjbb2005. Most of the overheads is due to the redirected interrupts and virtio kicks across L1 s. The overhead of IPI redirection, I/O interrupt redirection and page fault servicing are analyzed. Also note that the performance numbers for standard nested VM are worse than the numbers reported in the Turtles project [7], mainly because the Span VM uses a shadow-on-EPT configuration rather than multidimensional paging (nested EPT) as used in Turtles.

TABLE 1

Comparison of Kernbench performance.
Kernbench

|  | Host | Guest | Nested | Span |
|---|---|---|---|---|
| Run time | 136.15 | 146.31 | 634.70 | 674.79 |
| STD dev. | 8.09 | 1.13 | 8.79 | 9.68 |
| % overhead vs. host | — | 7.5 | 366.2 | 395.6 |
| % overhead vs. guest | — | — | 333.8 | 361.2 |
| % overhead vs. nested | — | — | — | 6.3 |
| % CPU | 97 | 90 | 100 | 100 |

TABLE 2

Comparison of SPECjbb2005 performance.
SPECjbb2005

|  | Host | Guest | Nested | Span |
|---|---|---|---|---|
| Score | 35416 | 28846 | 27289 | 27000 |
| STD dev. | 1058 | 1213 | 1863 | 1898 |
| % degradation vs. host | — | 18.6 | 22.9 | 23.8 |
| % degradation vs. guest | — | — | 5.4 | 6.4 |
| % degradation vs. nested | — | — | — | 1.3 |
| % CPU | 100 | 100 | 100 | 100 |

For I/O-intensive workloads, dd and netperf were used to measure the I/O throughput using virtio block and network devices. The command dd in Linux copies data of specified size between two devices. Netperf [28] is a network throughput measurement benchmark between a client and a server. As can be seen from Tables 3 and 4, a Span VM delivers similar throughput with dd and netperf as a standard nested VM does. For dd, Span VM has 6.6% degradation and for netperf, it has 9.5% degradation compared to the traditional nested VM. Both standard nested VM and Span VMs have significantly lower throughput than a non-nested VM and native execution. The reason is that I/O operations using virtio generate numerous virtio kicks, which are basically notifications from virtio front-end in the L2 guest to the virtio back-end in QEMU; these notifications are implemented using VM Exits via the L1 KVM kernel module. Processing each L2 VM Exit requires multiple L1 VM exits, leading to heavy CPU load.

TABLE 3

Comparison of dd throughput.
dd

|  | Host | Guest | Nested | Span |
|---|---|---|---|---|
| Throughput (MB/s) STD dev. | 80.1 | 65.15 | 21.3 | 19.89 |
|  | 5.05 | 1.98 | 2.33 | 1.67 |
| % overhead vs. host |  | 18.7 | 73.4 | 75.2 |
| % overhead vs. Guest |  |  | 67.3 | 69.5 |
| % overhead vs. nested |  |  |  | 6.6 |

TABLE 4

Netperf performance with 16 KB message size.
netperf

|  | Host | Guest | Nested | Span |
|---|---|---|---|---|
| Throughput (Mbps) STD dev. | 940.5 | 930.17 | 343.92 | 311.36 |
|  | 0.38 | 0.64 | 26.12 | 12.82 |
| % overhead vs. host |  | 1.1 | 63.4 | 66.9 |
| % overhead vs. Guest |  |  | 63.3 | 66.5 |
| % overhead vs. nested |  |  |  | 9.5 |

Micro Benchmarks

Span VM was tested with micro-benchmark to evaluate low-level system overheads.

One-Time Setup Overhead

Figure 6:
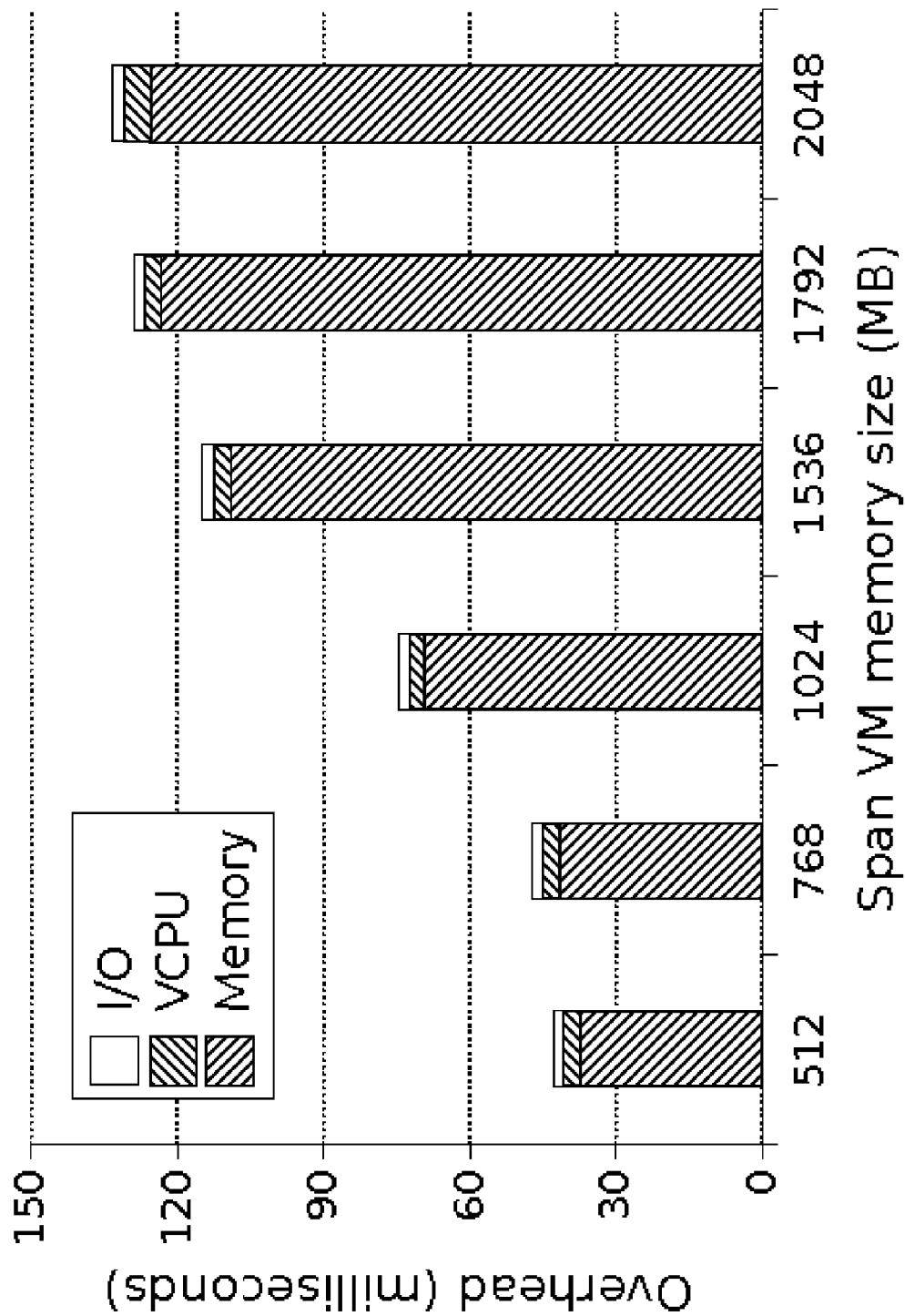
FIG. 6 shows a graph of one-time setup overhead.

After a standard L2 VM is booted up on L1 source' initializing it into a Span VM involves three major steps: (1) sharing the Span VM's memory, (2) distributing its VCPUs, and (3) distributing virtual I/O devices across the two L1s. Sharing the Span VM's memory involves pre-allocating guest physical addresses in L1, and invoking hypercalls to convey these addresses to L0. The benchmarked prototype implements these setup operations as a variant of the VM migration logic in the user-space QEMU process in L1 and the kernel-space KVM in the L1 and L0 hypervisors. FIG. 6 shows the breakup of this one-time setup overhead as the L2 memory size is increased. Most of the setup overhead comes from invoking hypercalls to convey the pre-allocated L1 guest physical addresses to L0. This cost increases as the size of the Span VM increases since more hypercalls are invoked. This overhead could potentially be reduced through more efficient batching of addresses conveyed to L0 through hypercalls. The costs of distributing VCPU and device I/O states is much smaller in comparison. The total time to set up a 2 GB Span VM is around 135 ms.

Page-Fault Servicing Overhead

Handling page-faults in Span VMs requires additional work in L0 hypervisor. Specifically, the EPT fault handler needs to ensure that an L2 VM's faulting virtual address maps to the same physical address, irrespective of whether it is accessed through L1 source or L1 target.

Table 5 compares the average page-fault servicing times for traditional nested and Span VMs. This time includes the additional work required to retrieve a physical page mapping from a table in L0, if the faulting address has been already allocated, otherwise the time required to allocate a new page, plus the time to map the faulting L1 GPA to the newly allocated L0 physical page. As seen from the table, Span introduces an average of 1.01 µs overhead in L1 shadow page-fault servicing time and 7.36 µs overhead in L0 EPT page fault servicing time.

TABLE 5

Average page fault service time.

| | Nested | Span | Difference |
|---|---|---|---|
| L1 shadow and interrupt delivery (µs) | 6.07 | 7.08 | 1.01 |
| Lo EPT page fault (µs) | 6.71 | 14.07 | 7.36 |

Redirection of IPI & Virtio Kicks

Table 6 shows that Span introduces an overhead of around 1.6 ms in redirecting an IPI between two VCPUs on different L1s over traditional IPI delivery between two colocated VCPUs in a standard nested VM. The overhead arises from sending the IPI messages from one one L1 to another using a virtio serial device-based communication channel between the two L1s.

TABLE 6

IPI redirection overhead.

| | Nested | Span | Difference |
|---|---|---|---|
| IPI delivery overhead (µs) | 18 | 1672 | 1654 |

The overhead of redirecting virtio kicks across L2s was tested by exchanging kick message repeatedly between the two QEMUs using the virtio serial port based communication mechanism. The kick redirection mechanism was found to take 916 µs longer than kick delivery in standard nested VMs, as shown in Table 7. The virtio serial port based redirection mechanism can be replaced by a more efficient channel, such as inter-L1 shared memory. Also, the use of direct device assignment at L2 will obviate the need of redirecting the virtio kicks.

TABLE 7

Virtio kicks redirection overhead.

| | Nested | Span | Difference |
|---|---|---|---|
| Virtio kicks overhead (µs) | 116 | 1032 | 916 |

CONCLUSION

Multi-hypervisor VMs, unlike standard nested VMs, execute simultaneously on multiple L1 hypervisors. Span provides systems support for an L2 VM that simultaneously runs on two L1 KVM hypervisors. Span works by sharing the L2 VM's memory footprint across the two L1 hypervisors and by distributing the responsibility of scheduling L2's VCPUs and I/O among the two L1s. The measured performance of Span VMs using various micro and macrobenchmarks is comparable to standard nested VMs.

The I/O performance of Span VMs may be improved through the use of direct device assignment and SR-IOV. Span VMs could run on more than two L1 hypervisors, mixed mode L1-L0 hypervisors, and a mix of commodity L1 hypervisors such as Xen and KVM. The Span VMs may also be subject to live migration.

Span VMs enable capabilities beyond traditional VM-Hypervisor systems by allowing an L2 VM to pick and choose among multiple L1 services, instead of solely relying on one L1 hypervisor for all services. Span VMs may also provide hypervisor fault-tolerance, wherein a backup L1 can take over an L2 VM's execution in case the primary L1 fails.

While Span typically resides on a single physical machine running one L0 hypervisor, by, for example, extending distributed virtual memory technology and live migration technology, Span can employ a distributed or multiple L0 platform. Therefore, a single physical machine is not a limitation of the technology. However, embodiments of the technology typically employ a single physical machine running one L0 hypervisor.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

The term "comprising", as used herein, shall be interpreted as including, but not limited to inclusion of other elements not inconsistent with the structures and/or functions of the other elements recited.

REFERENCES

The following references are expressly incorporated herein by reference in their entirety:

[1] AMD Virtualization (AMD-V). www.amd.com/us/solutions/servers/virtualization.

[2] Andrew S. Tanenbaum, M. Frans Kaashoek, Robbert van Renesse and Henri E. Bal. The Amoeba Distributed Operating System-A Status Report. In Computer Communications, volume 14, pages 324-335, 1991.

[3] P. Barham, B. Dragovic, K. Fraser, S. Hand, T. Harris, A. Ho, R. Neugebauer, I. Pratt, and A. Warfield. Xen and the art of virtualization. SIGOPS Operating Systems Review, 37(5):164-177, 2003.

[4] M. Beham, M. Vlad, and H. Reiser. Intrusion detection and honeypots in nested virtualization environments. In Proc. of Dependable Systems and Networks (DSN), June 2013.

[5] G. Belpaire and N.-T. Hsu. Formal properties of recursive virtual machine architectures. SIGOPS Oper. Syst. Rev., 9(5):89-96, November 1975.

[6] G. Belpaire and N.-T. Hsu. Hardware architecture for recursive virtual machines. In Annual ACM Conference, pages 14-18, 1975.

[7] M. Ben-Yehuda, M. D. Day, Z. Dubitzky, M. Factor, N. Har'El, A. Gordon, A. Liguori, O. Wasserman, and B.-A. Yassour. The turtles project: Design and implementation of nested virtualization. In Proc. of Operating Systems Design and Implementation, 2010.

[8] M. Ben-Yehuda, J. Mason, J. Xenidis, 0. Krieger, L. van Doom, J. Nakajima, A. Mallick, and E. Wahlig. Utilizing iommus for virtualization in linux and xen. In OLS '06: The 2006 Ottawa Linux Symposium, July 2006.

[9] M. Ben-Yehuda, J. Xenidis, M. Ostrowski, K. Rister, A. Bruemmer, and L. van Doom. The price of safety: Evaluating iommu performance. In OLS '07: The 2007 Ottawa Linux Symposium, pages 9-20, July 2007.

[10] S. Butt, H. A. Lagar-Cavilla, A. Srivastava, and V. Ganapathy. Self-service cloud computing. In Proceedings of the 2012 ACM Conference on Computer and Communications Security, CCS '12, pages 253-264, 2012.

[11] C. Clark, K. Fraser, S. Hand, J. Hansen, E. Jul, C. Limpach, I. Pratt, and A. Warfield. Live migration of virtual machines. In Proc. of Network System Design and Implementation, 2005.

[12] P. Colp, M. Nanavati, J. Zhu, W. Aiello, G. Coker, T. Deegan, P. Loscocco, and A. Warfield. Breaking up is hard to do: Security and functionality in a commodity hypervisor. In Proc. of SOSP, pages 189-202, 2011.

[13] B. Ford, M. Hibler, J. Lepreau, P. Tullmann, G. Back, and S. Clawson. Microkernels meet recursive virtual machines. SIGOPS Operating Sys. Rev., 30(SI):137-151, October 1996.

[14] T. Garfinkel and M. Rosenblum. A virtual machine introspection based architecture for intrusion detection. In Network & Distributed Systems Security Symposium, 2003.

[15] C. Gebhardt and C. Dalton. Lala: A late launch application. In Workshop on Scalable Trusted Computing, Chicago, Ill., USA, pages 1-8, 2009.

[16] R. P. Goldberg. Architecture of virtual machines. In Proceedings of the Workshop on Virtual Computer Systems, Cambridge, Mass., USA, pages 74-112, 1973.

[17] R. P. Goldberg. Survey of virtual machine research. Computer, 7(9):34-45, September 1974.

[18] A. Graf and J. Roedel. Nesting the virtualized world. In Linux Plumbers Conference, September 2009.

[19] M. Hines, U. Deshpande, and K. Gopalan. Postcopy live migration of virtual machines. In SIGOPS Operating Systems Review, July 2009.

[20] J.-C. Huang, M. Monchiero, Y. Turner, and H.-H. S. Lee. Ally: Os-transparent packet inspection using sequestered cores. In Symposium on Architectures for Networking and Communications Systems, 2011.

[21] X. Jiang, X. Wang, and D. Xu. Stealthy malware detection and monitoring through VMM-based "outof-the-box" semantic view reconstruction. ACM Trans. Information Systems Security, 13(2):1-28, March 2010.

[22] John K. Ousterhout, Andrew R. Cherenson, Frederick Douglis, Michael N. Nelson and Brent B. Welch. The Sprite network operating system. In IEEE Computer, volume 21, pages 23-36, February 1988.

[23] A. Kivity, Y. Kamay, D. Laor, U. Lublin, and A. Liguori. KVM: the linux virtual machine monitor. In Proc. of Linux Symposium, June 2007.

[24] C. Kolivas. Kernbench: ck.kolivas.org/apps/kernbench/kernbench-0.50/.

[25] D. G. Murray, G. Milos, and S. Hand. Improving xen security through disaggregation. In Proc. of Virtual Execution Environments, pages 151-160, 2008.

[26] J. Nakajima. Enabling Optimized Interrupt/APIC Virtualization in KVM. In KVM Forum, Barcelona, Spain, November 2012.

[27] G. Natapov. Nested EPT to make nested VMX faster. In KVM Forum, Edinburgh, October 2013. [28] Netperf. www.netperf.org/netperf/.

[29] D. L. Osisek, K. M. Jackson, and P. H. Gum. Esa/390 interpretive-execution architecture, foundation for vm/esa. IBM Systems Journal, 30(1):34-51, February 1991.

[30] PCI SIG. Single Root I/O Virtualization and Sharing 1.1 specification

[31] Phoenix Hyperspace. www.hyperspace.com/.

[32] G. J. Popek and R. P. Goldberg. Formal requirements for virtualizable third generation architectures. Communications of ACM, 17(7):412-421, July 1974.

[33] R. Riley, X. Jiang, and D. Xu. Guest-transparent prevention of kernel rootkits with vmm-based memory shadowing. In Proceedings of the 11th International Symposium on Recent Advances in Intrusion Detection, pages 1-20, 2008.

[34] R. Russell. Virtio: Towards a de-facto standard for virtual i/o devices. SIGOPS Oper. Syst. Rev., 42(5):95-103, July 2008.

[35] J. Rutkowska. Subverting vista kernel for fun and profit. In Blackhat, August 2006. www.scalemp.com/mediahub/resources/white-papers.

[36] Sape J. Mullende, Guido van Rossum, Andrew S. Tanenbaum, Robbert van Renessey and Hans van Staveren. Amoeba: a distributed operating system for the 1990s. In IEEE Computer, volume 23, pages 44-53, May 1990.

[37] A. Seshadri, M. Luk, N. Qu, and A. Perrig. Secvisor: a tiny hypervisor to provide lifetime kernel code integrity for commodity oses. In ACM SIGOPS Operating Systems Review, volume 41(6), pages 335-350, 2007.

[38] E. G. Sirer, R. Grimm, A. J. Gregory, and B. N. Bershad. Design and implementation of a distributed virtual machine for networked computers. SIGOPS Oper. Syst. Rev., 33(5):202-216, December 1999.

[39] SPECjbb2005. www.spec.org/jbb2005/.

[40] U. Steinberg and B. Kauer. Nova: A microhypervisor-based secure virtualization architecture. In Proc. of EuroSys, pages 209-222, 2010.

[41] J. Sugerman, G. Venkitachalam, and B.-H. Lim. Virtualizing I/O devices on vmware workstation's hosted virtual machine monitor. In Proceedings of USENIX Annual Technical Conference, 2002.

[42] R. Uhlig, G. Neiger, D. Rodgers, A. Santoni, F. Martins, A. Anderson, S. Bennett, A. Kagi, F. Leung, and L. Smith. Intel virtualization technology. Computer, 38(5):48-56, 2005. www.pcisig.com/specifications/iov/single root/.

[43] Vsmp Foundation Architecture.

[44] O. Wasserman. Nested virtualization: shadow turtles. In KVM Forum, Edinburgh, Spain, October 2013.

[45] D. Williams, H. Jamjoom, and H. Weatherspoon. The Xen-Blanket: Virtualize once, run everywhere. In EuroSys, Bern, Switzerland, 2012.

[46] L. Xia, K. Hale, and P. Dinda. ConCORD: Easily exploiting memory content redundancy through the content-aware service command. In Proc. of High Performance Distributed Computing,

[47] A. Baumann, P. Barham, P.-E. Dagand, T. Harris, R. Isaacs, S. Peter, T. Roscoe, A. Schupbach, and A. Singhania. The Multikernel: A new OS architecture for scalable multicore systems. In Proceedings of SOSP, Big Sky, Mont., USA, 2009.

[48] M. Ben-Yehuda, M. D. Day, Z. Dubitzky, M. Factor, N. Har'El, A. Gordon, A. Liguori, O. Wasserman, and B.-A. Yassour. The Turtles project: Design and implementation of nested virtualization. In Proc. of Operating Systems Design and Implementation, 2010.

[49] M. Chapman and G. Heiser. vNUMA: A virtual shared-memory multiprocessor. In Proc. of USENIX Annual Technical Conference, 2009.

[50] H. Chen, R. Chen, F. Zhang, B. Zang, and P. Yew. Live updating operating systems using virtualization. In Proc. of ACM VEE, Ottawa, Canada, June 2006.

[51] B. Cully, G. Lefebvre, D. Meyer, M. Feeley, N. Hutchinson, and A. Warfield. Remus: High availability via asynchronous virtual machine replication. In Proc. of Networked Systems Design and Implementation, 2008.

[52] A. Dinaburg, P. Royal, M. Sharif, and W. Lee. Ether: malware analysis via hardware virtualization extensions. In 15th ACM conference on Computer and communications security (CCS), pages 51-62, 2008. ISBN 978-1-59593-810-7.

[53] G. W. Dunlap, S. T. King, S. Cinar, M. A. Basrai, and P. M. Chen. ReVirt: Enabling intrusion analysis through virtualmachine logging and replay. In Proc. of USENIX OSDI, Boston, Mass., December 2002.

[54] IPSECS. Kernel Beast rootkit/kbeast-v 1/.

[55] K. Kourai and S. Chiba. Hyperspector: Virtual distributed monitoring environments for secure intrusion detection. In ACM/USENIX International Conference on Virtual Execution Environments, pages 197-207, 2005.

[56] B. D. Payne, M. Carbone, M. Sharif, and W. Lee. Lares: An architecture for secure active monitoring using virtualization. In IEEE Symposium on Security and Privacy, pages 233-247, 2008.

[57] J. Toldinas, D. Rudzika, Y. Stuikys, and G. Ziberkas. Rootkit detection experiment within a virtual environment. Electronics and Electrical Engineering-Kaunas: Technologija, (8):104, 2009.

[58] A. Vasilevsky, D. Lively, and S. Ofsthun. Linux Virtualization on Virtual Iron V Fe. In Proc. of Linux Symposium, pages 235-250, 2005.

[59] A. Whitaker, R. Cox, and M. Shaw. Constructing services with in terposable virtual hardware. In Proc. of NSDI, San Francisco. Calif., 2004.

[60] Sirer, E. G., Grimm, R., Gregory, A. J., and Bershad, B. N. Design and implementation of a distributed virtual machine for networked computers. SIGOPS Oper. Syst. Rev. 33, 5 (December 1999), 202-216.

[61] Williams, D., Jamjoom, H., and Weatherspoon, H. The Xen-Blanket: Virtualize once, run everywhere. In EuroSys, Bern, Switzerland (2012).

[62] Jian Wang, Kwame-Lante Wright and Kartik Gopalan. XenLoop: A Transparent High Performance Inter-VM Network Loopback. In Proceedings of the 17th International Symposium on pages 109-118, 2008.

[63] A. Cameron Macdonell "Shared-memory optimizations for virtual machines" Ph.D. Dissertation, University of Alberta 2011, Paul Lu thesis advisor

What is claimed is:

1. A multi-hypervisor virtual machine system, comprising:
a unitary host machine including one or more processors;
at least one unitary virtual machine from a plurality of unitary virtual machines which concurrently relies on each of at least two concurrently available hypervisors to interface with the unitary host machine; and
the at least two concurrently available hypervisors,
the at least one unitary virtual machine being configured to concurrently communicate with the at least two concurrently available hypervisors to execute on the unitary host machine,
wherein a first concurrently available hypervisor from the at least two concurrently available hypervisors controls a first virtual central processing unit of the at least one unitary virtual machine, and a second concurrently available hypervisor from the at least two concurrently available hypervisors controls a second virtual central processing unit of the at least one unitary virtual machine, and
wherein the first concurrently available hypervisor is selected for relaying input/output requests generated from the at least one unitary virtual machine running on the second virtual central processing unit to the first virtual central processing unit, such that when outgoing packets from the at least one unitary virtual machine switch back and forth between the first concurrently available hypervisor and the second concurrently available hypervisor, the outgoing packets from the at least one unitary virtual machine are restricted to exit via only the first concurrently available hypervisor.

2. The multi-hypervisor virtual machine system according to claim 1, wherein one concurrently available hypervisor from the at least two concurrently available hypervisors is hierarchically inferior to another concurrently available hypervisor from the at least two concurrently available hypervisors.

3. The multi-hypervisor virtual machine system according to claim 1, wherein the at least two concurrently available hypervisors have respectively different sets of execution privileges.

4. The multi-hypervisor virtual machine system according to claim 1, wherein the existence of the at least two concurrently available hypervisors is transparent to a guest operating system which executes on the at least one unitary virtual machine.

5. The multi-hypervisor virtual machine system according to claim 1, wherein an operating system and applications of the at least one unitary virtual machine execute substantially without explicit control by the operating system and the applications over a selection of respective actions of the at least two concurrently available hypervisors.

6. The multi-hypervisor virtual machine system according to claim 1, wherein at least one portion of a memory map associated with the at least one unitary virtual machine is associated exclusively with a single concurrently available hypervisor from the at least two concurrently available hypervisors.

7. The multi-hypervisor virtual machine system according to claim 1, wherein a plurality of concurrently available hypervisors from the at least two concurrently available hypervisors partition responsibility for scheduling at least one respective virtual central processing unit of the unitary host machine.

8. The multi-hypervisor virtual machine system according to claim 1, wherein the at least two concurrently available hypervisors offer different services to the at least one unitary virtual machine.

9. The multi-hypervisor virtual machine system according to claim 1, wherein the plurality of unitary virtual machines are provided, and at least two of the plurality of unitary virtual machines rely on the at least two concurrently available hypervisors to interface with the unitary host machine.

10. The multi-hypervisor virtual machine system according to claim 1, wherein responsibility for servicing the input/output requests of the at least one unitary virtual machine is partitioned at a device-level granularity among a plurality of the concurrently available hypervisors from the at least two concurrently available hypervisors.

11. The multi-hypervisor virtual machine system according to claim 1, wherein the at least one unitary virtual machine is configured to execute a guest operating system which supports a polling mode driver for receiving communications via the first concurrently available hypervisor, substantially without interrupts.

12. The multi-hypervisor virtual machine system according to claim 1, wherein the first concurrently available hypervisor which controls the first virtual central processing unit of the at least one unitary virtual machine is selected for relaying the input/output requests generated from the at least one unitary virtual machine on the second virtual central processing unit controlled by the second concurrently available hypervisor.

13. The multi-hypervisor virtual machine system according to claim 1, wherein the first concurrently available hypervisor is selected for relaying device interrupts to the second concurrently available hypervisor for delivery to the second virtual central processing unit of the at least one unitary virtual machine controlled by the second concurrently available hypervisor.

14. The multi-hypervisor virtual machine system according to claim 13, wherein the device interrupts are generated by at least one hardware device, and delivered to the first virtual central processing unit of the at least one unitary virtual machine per an interrupt affinity specified by a guest operating system executing in the at least one unitary virtual machine.

15. The multi-hypervisor virtual machine system according to claim 1, wherein responsibility for servicing the input/output requests of the at least one unitary virtual machine is partitioned at a device-level granularity among a plurality of concurrently available hypervisors from the at least two concurrently available hypervisors.

16. A method for providing multiple hypervisors for a virtual machine system, comprising:
providing a unitary host machine including one or more processors;
providing at least two hypervisors which are concurrently available and independently execute on the unitary host machine; and
executing a unitary virtual machine which concurrently relies on the at least two concurrently available hypervisors to interface with the unitary host machine, the unitary virtual machine having a memory map which has portions accessible by each of the at least two concurrently available hypervisors,
wherein a first hypervisor of the at least two hypervisors is selected for relaying input/output requests generated from each of the at least two hypervisors on the unitary virtual machine, such that when outgoing packets from the unitary virtual machine switch back and forth between the at least two hypervisors, the outgoing packets from the unitary virtual machine are restricted to exit via only the first hypervisor.

17. The method according to claim 16, wherein one of the at least two concurrently available hypervisors is hierarchically inferior to another of the at least two concurrently available hypervisors.

18. The method according to claim 16, wherein:
the at least two hypervisors have respectively different sets of execution privileges and offer different services to the unitary virtual machine, and
responsibility for servicing the input/output requests of the unitary virtual machine is partitioned at a device-level granularity among a plurality of hypervisors from the at least two hypervisors to select the first hypervisor from the at least two hypervisors.

19. A method for providing multiple hypervisors for a virtual machine system, comprising:
providing a single virtual machine supporting execution of a guest operating system and having a memory map, the guest operating system supporting execution of applications, on hardware resources of a unitary host machine including one or more processors;
providing at least two concurrently available and independently executing hypervisors which each concurrently interface the single virtual machine to the unitary host machine, the at least two concurrently available and independently executing hypervisors each having access to at least a respective portion of the memory map;
performing a first action by the single virtual machine which employs resources provided by a first hypervisor of the at least two concurrently available and independently executing hypervisors, and controls at least one virtual central processing unit of the single virtual machine;
performing a second action by the single virtual machine which employs resources provided by a second hypervisor of the at least two concurrently available and independently executing hypervisors;
servicing input/output requests of the single virtual machine by the first hypervisor, on behalf of both the first hypervisor and the second hypervisor, such that when outgoing packets from the single virtual machine switch back and forth between the first hypervisor and the second hypervisor, the outgoing packets from the at least one unitary virtual machine are restricted to exit via only the first hypervisor; and
relaying device interrupts from the first hypervisor to the second hypervisor,
wherein the first and second hypervisors have respectively different sets of execution privileges and offer different services to the single virtual machine.

20. The method according to claim 19, wherein the at least two concurrently available and independently executing hypervisors each have respectively different sets of execution privileges.

* * * * *